(12) United States Patent
Muthuraman et al.

(10) Patent No.: US 11,585,948 B2
(45) Date of Patent: Feb. 21, 2023

(54) IONOSPHERIC DELAY ESTIMATION FOR GLOBAL NAVIGATION SATELLITE SYSTEM SIGNALS

(71) Applicant: QUALCOMM Incorporated, San Diego, CA (US)

(72) Inventors: Kannan Muthuraman, Mission Viejo, CA (US); David Tuck, San Juan Capistrano, CA (US)

(73) Assignee: QUALCOMM Incorporated, San Diego, CA (US)

( * ) Notice: Subject to any disclaimer, the term of this patent is extended or adjusted under 35 U.S.C. 154(b) by 274 days.

(21) Appl. No.: 17/103,125

(22) Filed: Nov. 24, 2020

(65) Prior Publication Data
US 2022/0163679 A1    May 26, 2022

(51) Int. Cl.
| | | |
|---|---|---|
| G01S 19/43 | (2010.01) | |
| H04W 4/024 | (2018.01) | |
| G01S 19/39 | (2010.01) | |

(52) U.S. Cl.
CPC ............ G01S 19/43 (2013.01); G01S 19/396 (2019.08); H04W 4/024 (2018.02)

(58) Field of Classification Search
CPC ....... G01S 19/43; G01S 19/396; H04W 4/024
USPC ..................................................... 455/456.1
See application file for complete search history.

(56) References Cited

U.S. PATENT DOCUMENTS

| | | |
|---|---|---|
| 2003/0201933 A1 | 10/2003 | Cohen et al. |
| 2005/0216210 A1 | 9/2005 | Bartone et al. |
| 2013/0271318 A1 | 10/2013 | Doucet et al. |
| 2016/0231430 A1 | 8/2016 | Wilson et al. |
| 2018/0188378 A1 | 7/2018 | Rapoport |

FOREIGN PATENT DOCUMENTS

CN    109709591 A    5/2019

OTHER PUBLICATIONS

International Search Report and Written Opinion—PCT/US2021/052761—ISA/EPO—dated Jan. 20, 2022.

*Primary Examiner* — Joel Ajayi
(74) *Attorney, Agent, or Firm* — Qualcomm Incorporated

(57) ABSTRACT

Techniques are provided for utilizing a mobile device to estimate ionospheric delays in GNSS transmissions. An example method of determining a position of a mobile device includes obtaining a pseudorange measurements and carrier-phase measurements for a satellite at a first frequency band and a second frequency band, determining a bias estimate for the satellite based on a plurality of pseudorange measurements and carrier-phase measurements, determining a delta carrier-phase measurement for the satellite based on the carrier-phase measurements at the first frequency band and the second frequency band, and determining the position of the mobile device based at least in part on the delta carrier-phase measurement, and the pseudorange measurements, the carrier-phase measurements, or both.

28 Claims, 10 Drawing Sheets

IONOSPHERIC DELAY ESTIMATION FOR GLOBAL NAVIGATION SATELLITE SYSTEM SIGNALS

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data. Internet-capable wireless service and a fourth-generation (4G) service (e.g., Long Term Evolution (LTE) or WiMax). There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, etc.

It is often desirable to know the location of a user equipment (UE), e.g., a cellular phone, with the terms "location" and "position" being synonymous and used interchangeably herein. A location services (LCS) client may desire to know the location of the UE and may communicate with a location center in order to request the location of the UE. The location center and the UE may exchange messages, as appropriate, to obtain a location estimate for the UE. The location center may return the location estimate to the LCS client, e.g., for use in one or more applications.

Obtaining the location of a mobile device that is accessing a wireless network may be useful for many applications including, for example, emergency calls, personal navigation, asset tracking, locating a friend or family member, etc. Existing positioning methods include methods based on measuring radio signals transmitted from a variety of devices including satellite vehicles and terrestrial radio sources in a wireless network such as base stations and access points.

Many UEs include a Global Navigation Satellite System (GNSS) receiver and may determines a position by precisely measuring the arrival time of signaling events received from multiple satellites. Each satellite transmits a navigation message containing the precise time when the message was transmitted and ephemeris information. Each sub-frame of the navigation message starts with a telemetry word (TLM) and the number of the sub-frame. The start of the sub-frame may be detected by means of a preamble sequence in the TLM. Each sub-frame also includes a handover word (HOW), which gives the exact time of the week (TOW) when the satellite will transmit the next sub-frame according to the local version of GNSS time held by the satellite's clock. The ephemeris information includes details about the satellite's orbit and corrections for the satellite's own clock, in comparison with GNSS time. The ephemeris and clock correction parameters may collectively be known as ephemeris information.

In addition to the time and ephemeris information, the data message also contains the satellite constellation almanac, parameters representing the ionospheric delay, health parameters and other information used by some receivers. For example, in GPS/QZSS constellations, there are 25 different frames of data broadcast from each satellite. Each frame contains identical information (apart from time) in sub-frames 1-3 inclusive but cycles through a pre-assigned sequence of data in sub-frames 4 and 5, which contain almanac and other information. The ephemeris information, including the satellite clock biases, may be periodically refreshed (e.g., every 2 hours), so that the navigation data message is representative of the orbit and status of each satellite. Other constellations may use different parameters. In some cases, the ionospheric delay information broadcast from each satellite may be based on a general model which does not apply to the UE's current location, or it may become out of date as the ionosphere shifts. Inaccuracies in the ionospheric delay may degrade the accuracy of the location computations performed by a GNSS module in the UE.

SUMMARY

An example method of determining a position of a mobile device according to the disclosure includes obtaining a pseudorange measurements and carrier-phase measurements for a satellite at a first frequency band and a second frequency band, determining a bias estimate for the satellite based on a plurality of pseudorange measurements and carrier-phase measurements, determining a delta carrier-phase measurement for the satellite based on the carrier-phase measurements at the first frequency band and the second frequency band, and determining the position of the mobile device based at least in part on the delta carrier-phase measurement, and the pseudorange measurements, the carrier-phase measurements, or both.

Implementations of such a method may include one or more of the following features. The plurality of pseudorange measurements and carrier-phase measurements may be obtained in an epoch. The delta carrier-phase measurement at the epoch may correspond to the plurality of pseudorange measurements and carrier-phase measurements received in the epoch. The bias estimate may be determined across multiple, continuous epochs and the delta carrier-phase measurement is determined at the epoch. Determining the bias estimate may include determining a divergence-free, smoothed estimate based on the plurality of pseudorange measurements and carrier-phase measurements. The bias estimate may be based on a weighted average of a plurality of delta-pseudorange measurements and a plurality of delta-carrier-phase measurements with the satellite based on the first frequency band and the second frequency band made over time. A first number of the pseudorange measurements and carrier-phase measurements received on the first frequency band may be greater than a second number of the plurality of pseudorange measurements and carrier-phase measurements received on the second frequency band.

An example apparatus according to the disclosure includes a memory, at least one receiver, at least one processor communicatively coupled to the memory and the at least one receiver, the at least one processor configured to obtain, via the at least one receiver, a pseudorange measurements and carrier-phase measurements for a satellite at a first frequency band and a second frequency band, determine a bias estimate for the satellite based on a plurality of pseudorange measurements and carrier-phase measurements, determine a delta carrier-phase measurement for the satellite based on the carrier-phase measurements at the first frequency band and the second frequency band, and determine a position based at least in part on the delta carrier-phase measurement, and the pseudorange measurements, the carrier-phase measurements, or both.

Implementations of such an apparatus may include one or more of the following features. The plurality of pseudorange measurements and carrier-phase measurements may be obtained in an epoch. The at least one processor may be further configured to determine the delta carrier-phase measurement based on the plurality of pseudorange measurements and carrier-phase measurements received in the epoch. The at least one processor may be further configured to determine the bias estimate across multiple, continuous epochs and determine the delta carrier-phase measurement in the epoch. The at least one processor may be further configured to determine a divergence-free, smoothed estimate based on the plurality of pseudorange measurements and carrier-phase measurements. The at least one processor may be further configured to compute a weighted average of a plurality of delta-pseudorange measurements and a plurality of delta-carrier-phase measurements with the satellite based on the first frequency band and the second frequency band made over time. A first number of the pseudorange measurements and carrier-phase measurements received on the first frequency band may be greater than a second number of the plurality of pseudorange measurements and carrier-phase measurements received on the second frequency band.

An example apparatus for determining a position of a mobile device according to the disclosure includes means for obtaining a pseudorange measurements and carrier-phase measurements for a satellite at a first frequency band and a second frequency band, means for determining a bias estimate for the satellite based on a plurality of pseudorange measurements and carrier-phase measurements, means for determining a delta carrier-phase measurement for the satellite based on the carrier-phase measurements at the first frequency band and the second frequency band, and means for determining the position of the mobile device based at least in part on the delta carrier-phase measurement, and the pseudorange measurements, the carrier-phase measurements, or both.

An example non-transitory processor-readable storage medium comprising processor-readable instructions configured to cause one or more processors to determine a position of a mobile device according to the disclosure includes code for obtaining a pseudorange measurements and carrier-phase measurements for a satellite at a first frequency band and a second frequency band, code for determining a bias estimate for the satellite based on a plurality of pseudorange measurements and carrier-phase measurements, code for determining a delta carrier-phase measurement for the satellite based on the carrier-phase measurements at the first frequency band and the second frequency band, and code for determining the position of the mobile device based at least in part on the delta carrier-phase measurement, and the pseudorange measurements, the carrier-phase measurements, or both.

Items and/or techniques described herein may provide one or more of the following capabilities, as well as other capabilities not mentioned. An GNSS receiver may be configured to receive navigation signals transmitted from navigation satellites. The navigation signals may be on different frequencies. Pseudorange and carrier-phase measurements may be obtained from a satellite on a pair of frequencies. The GNSS receiver may be configured to determine a delta pseudorange value and a delta carrier-phase value based on measurements obtained on the pair of frequencies. A bias estimate may be determined based on the delta pseudorange and delta carrier-phase values. An ionospheric delay estimate may be computed based in part on the bias estimate. The ionospheric delay estimate may be computed in any region. Position accuracies may be improved based on the ionospheric delay estimate. Requirements to decode broadcast data including other ionospheric delay estimate information may be eliminated and the power consumption of the GNSS receiver may be reduced. Other capabilities may be provided and not every implementation according to the disclosure must provide any, let alone all, of the capabilities discussed.

DETAILED DESCRIPTION

Techniques are discussed herein for utilizing a mobile device to estimate ionospheric delays in GNSS transmissions. For example, a mobile device may obtain pseudorange and carrier-phase measurements with a satellite on at least a pair of frequencies, and determine a bias estimate for the pseudorange and carrier-phase measurements. The bias estimate will be associated with the satellite and the pair of frequencies. The mobile device may then determine a delta carrier-phase measurement with the satellite based on the pair of frequencies for a desired epoch, and compute an estimate of ionospheric delay present in the pseudorange and carrier phase measurements obtained at the desired epoch for the satellite. These techniques and configurations are examples, and other techniques and configurations may be used.

Figure 1:
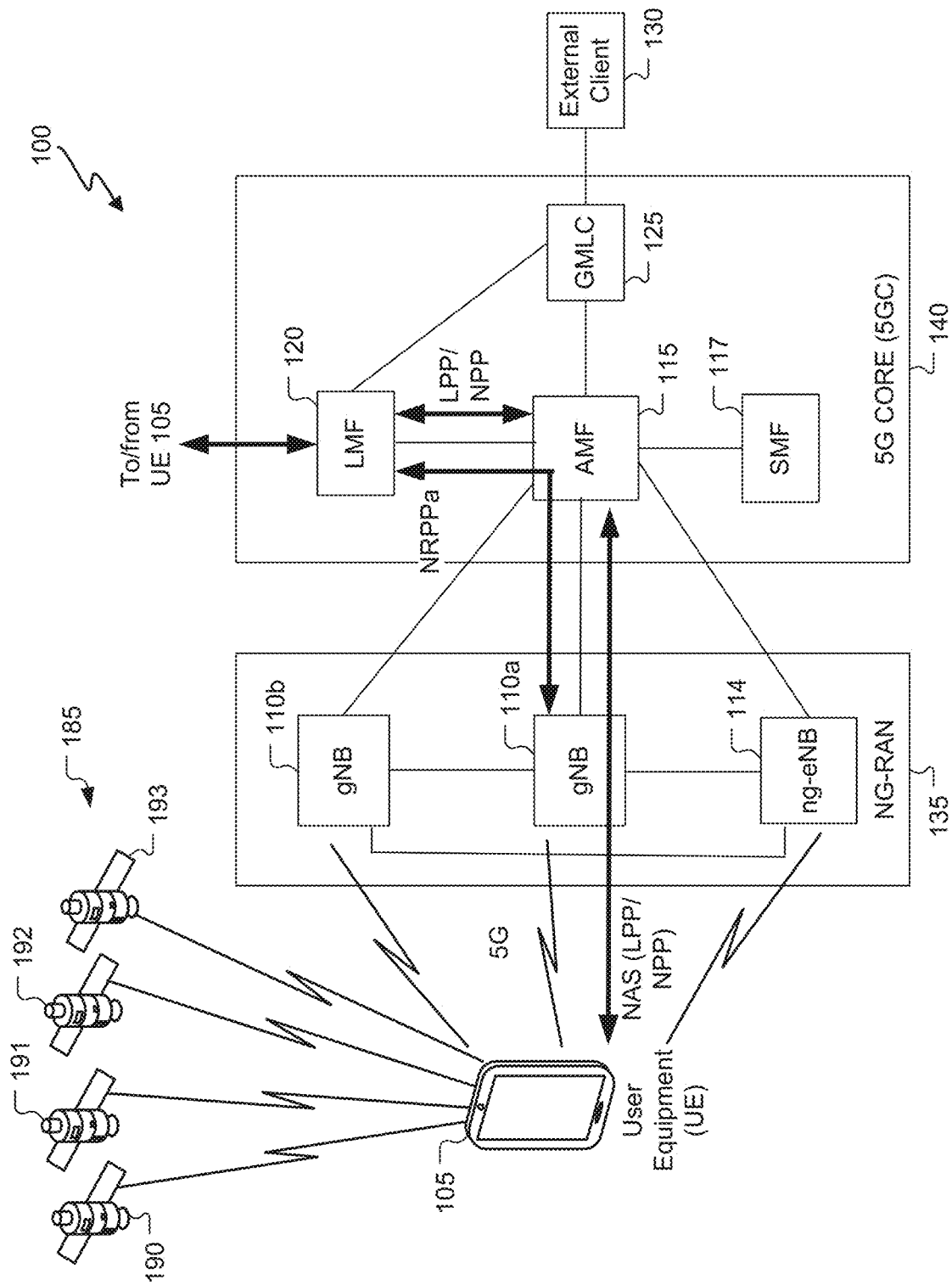
FIG. 1 is a simplified diagram of an example wireless communications system.

Referring to FIG. 1, an example of a communication system 100 includes a UE 105, a Radio Access Network (RAN) 135, here a Fifth Generation (5G) Next Generation (NG) RAN (NG-RAN), and a 5G Core Network (5GC) 140. The UE 105 may be, e.g., an IoT device, a location tracker device, a cellular telephone, or other device. A 5G network may also be referred to as a New Radio (NR) network; NG-RAN 135 may be referred to as a 5G RAN or as an NR RAN; and 5GC 140 may be referred to as an NG Core network (NGC). Standardization of an NG-RAN and 5GC is ongoing in the 3$^{rd}$ Generation Partnership Project (3GPP). Accordingly, the NG-RAN 135 and the 5GC 140 may conform to current or future standards for 5G support from 3GPP. The RAN 135 may be another type of RAN, e.g., a 3G RAN, a 4G Long Term Evolution (LTE) RAN, etc. The communication system 100 may utilize information from a constellation 185 of satellite vehicles (SVs) 190, 191, 192, 193 for a Satellite Positioning System (SPS) (e.g., a Global Navigation Satellite System (GNSS)) like the Global Positioning System (GPS), the Global Navigation Satellite System (GLONASS), Galileo, or Beidou or some other local or regional SPS such as the Indian Regional Navigational Satellite System (IRNSS), the European Geostationary Navigation Overlay Service (EGNOS), or the Wide Area Augmentation System (WAAS). Additional components of the communication system 100 are described below. The communication system 100 may include additional or alternative components.

As shown in FIG. 1, the NG-RAN 135 includes NR nodeBs (gNBs) 110*a*, 110*b*, and a next generation eNodeB (ng-eNB) 114, and the 5GC 140 includes an Access and Mobility Management Function (AMF) 115, a Session Management Function (SMF) 117, a Location Management Function (LMF) 120, and a Gateway Mobile Location Center (GMLC) 125. The gNBs 110*a*, 110*b* and the ng-eNB 114 are communicatively coupled to each other, are each configured to bi-directionally wirelessly communicate with the UE 105, and are each communicatively coupled to, and configured to bi-directionally communicate with, the AMF 115. The AMF 115, the SMF 117, the LMF 120, and the GMLC 125 are communicatively coupled to each other, and the GMLC is communicatively coupled to an external client 130. The SMF 117 may serve as an initial contact point of a Service Control Function (SCF) (not shown) to create, control, and delete media sessions.

FIG. 1 provides a generalized illustration of various components, any or all of which may be utilized as appropriate, and each of which may be duplicated or omitted as necessary. Specifically, although only one UE 105 is illustrated, many UEs (e.g., hundreds, thousands, millions, etc.) may be utilized in the communication system 100. Similarly, the communication system 100 may include a larger (or smaller) number of SVs (i.e., more or fewer than the four SVs 190-193 shown), gNBs 110*a*, 100*b*, ng-eNBs 114. AMFs 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), etc. Implementations described herein (be they for 5G technology and/or for one or more other communication technologies and/or protocols) may be used to transmit (or broadcast) directional synchronization signals, receive and measure directional signals at UEs (e.g., the UE 105) and/or provide location assistance to the UE 105 (via the GMLC 125 or other location server) and/or compute a location for the UE 105 at a location-capable device such as the UE 105, the gNB 110*a*, 110*b*, or the LMF 120 based on measurement quantities received at the UE 105 for such directionally-transmitted signals. The gateway mobile location center (GMLC) 125, the location management function (LMF) 120, the access and mobility management function (AMF) 115, the SMF 117, the ng-eNB (eNodeB) 114 and the gNBs (gNodeBs) 110*a*, 110*b* are examples and may, in various embodiments, be replaced by or include various other location server functionality and/or base station functionality respectively.

The UE 105 may comprise and/or may be referred to as a device, a mobile device, a wireless device, a mobile terminal, a terminal, a mobile station (MS), a Secure User Plane Location (SUPL) Enabled Terminal (SET), or by some other name. Moreover, the UE 105 may correspond to a cellphone, smartphone, laptop, tablet, PDA, tracking device, navigation device, Internet of Things (IoT) device, asset tracker, health monitors, security systems, smart city sensors, smart meters, wearable trackers, or some other portable or moveable device. Typically, though not necessarily, the UE 105 may support wireless communication using one or more Radio Access Technologies (RATs) such as Global System for Mobile communication (GSM), Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G new radio (NR) (e.g., using the NG-RAN 135 and the 5GC 140), etc. The UE 105 may support wireless communication using a Wireless Local Area Network (WLAN) which may connect to other networks (e.g., the Internet) using a Digital Subscriber Line (DSL) or packet cable, for example. The use of one or more of these RATs may allow the UE 105 to communicate with the external client 130 (e.g., via elements of the 5GC 140 not shown in FIG. 1, or possibly via the GMLC 125) and/or allow the external client 130 to receive location information regarding the UE 105 (e.g., via the GMLC 125).

The UE 105 may include a single entity or may include multiple entities such as in a personal area network where a user may employ audio, video and/or data I/O (input/output) devices and/or body sensors and a separate wireline or wireless modem. An estimate of a location of the UE 105 may be referred to as a location, location estimate, location fix, fix, position, position estimate, or position fix, and may be geographic, thus providing location coordinates for the UE 105 (e.g., latitude and longitude) which may or may not include an altitude component (e.g., height above sea level, height above or depth below ground level, floor level, or basement level). Alternatively, a location of the UE 105 may be expressed as a civic location (e.g., as a postal address or the designation of some point or small area in a building such as a particular room or floor). A location of the UE 105 may be expressed as an area or volume (defined either geographically or in civic form) within which the UE 105 is expected to be located with some probability or confidence level (e.g., 67%, 95%, etc.). A location of the UE 105 may be expressed as a relative location comprising, for example, a distance and direction from a known location. The relative location may be expressed as relative coordinates (e.g., X, Y (and Z) coordinates) defined relative to some origin at a known location which may be defined, e.g., geographically, in civic terms, or by reference to a point, area, or volume, e.g., indicated on a map, floor plan, or building plan. In the description contained herein, the use of the term location may comprise any of these variants unless indicated otherwise. When computing the location of a UE, it is common to solve for local x, y, and possibly z coordinates and then, if desired, convert the local coordinates into absolute coordinates (e.g., for latitude, longitude, and altitude above or below mean sea level).

The UE 105 may be configured to communicate with other entities using one or more of a variety of technologies. The UE 105 may be configured to connect indirectly to one or more communication networks via one or more device-to-device (D2D) peer-to-peer (P2P) links. The D2D P2P links may be supported with any appropriate D2D radio access technology (RAT), such as LTE Direct (LTE-D), WiFi Direct (WiFi-D), Bluetooth®, and so on. One or more of a group of UEs utilizing D2D communications may be within a geographic coverage area of a Transmission/Reception Point (TRP) such as one or more of the gNBs 110a, 110b, and/or the ng-eNB 114. Other UEs in such a group may be outside such geographic coverage areas, or may be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP.

Base stations (BSs) in the NG-RAN 135 shown in FIG. 1 include NR Node Bs, referred to as the gNBs 110a and 110b. Pairs of the gNBs 110a, 110b in the NG-RAN 135 may be connected to one another via one or more other gNBs. Access to the 5G network is provided to the UE 105 via wireless communication between the UE 105 and one or more of the gNBs 110a, 110b, which may provide wireless communications access to the 5GC 140 on behalf of the UE 105 using 5G. In FIG. 1, the serving gNB for the UE 105 is assumed to be the gNB 110a, although another gNB (e.g. the gNB 110b) may act as a serving gNB if the UE 105 moves to another location or may act as a secondary gNB to provide additional throughput and bandwidth to the UE 105.

Base stations (BSs) in the NG-RAN 135 shown in FIG. 1 may include the ng-eNB 114, also referred to as a next generation evolved Node B. The ng-eNB 114 may be connected to one or more of the gNBs 110a, 110b in the NG-RAN 135, possibly via one or more other gNBs and/or one or more other ng-eNBs. The ng-cNB 114 may provide LTE wireless access and/or evolved LTE (eLTE) wireless access to the UE 105. One or more of the gNBs 110a, 110b and/or the ng-eNB 114 may be configured to function as positioning-only beacons which may transmit signals to assist with determining the position of the UE 105 but may not receive signals from the UE 105 or from other UEs.

The BSs 110a, 110b, 114 may each comprise one or more TRPs. For example, each sector within a cell of a BS may comprise a TRP, although multiple TRPs may share one or more components (e.g., share a processor but have separate antennas). The system 100 may include only macro TRPs or the system 100 may have TRPs of different types, e.g., macro, pico, and/or femto TRPs, etc. A macro TRP may cover a relatively large geographic area (e.g., several kilometers in radius) and may allow unrestricted access by terminals with service subscription. A pico TRP may cover a relatively small geographic area (e.g., a pico cell) and may allow unrestricted access by terminals with service subscription. A femto or home TRP may cover a relatively small geographic area (e.g., a femto cell) and may allow restricted access by terminals having association with the femto cell (e.g., terminals for users in a home).

As noted, while FIG. 1 depicts nodes configured to communicate according to 5G communication protocols, nodes configured to communicate according to other communication protocols, such as, for example, an LTE protocol or IEEE 802.11x protocol, may be used. For example, in an Evolved Packet System (EPS) providing LTE wireless access to the UE 105, a RAN may comprise an Evolved Universal Mobile Telecommunications System (UMTS) Terrestrial Radio Access Network (E-UTRAN) which may comprise base stations comprising evolved Node Bs (eNBs). A core network for EPS may comprise an Evolved Packet Core (EPC). An EPS may comprise an E-UTRAN plus EPC, where the E-UTRAN corresponds to the NG-RAN 135 and the EPC corresponds to the 5GC 140 in FIG. 1.

The gNBs 110a, 110b and the ng-eNB 114 may communicate with the AMF 115, which, for positioning functionality, communicates with the LMF 120. The AMF 115 may support mobility of the UE 105, including cell change and handover and may participate in supporting a signaling connection to the UE 105 and possibly data and voice bearers for the UE 105. The LMF 120 may communicate directly with the UE 105, e.g., through wireless communications. The LMF 120 may support positioning of the UE 105 when the UE 105 accesses the NG-RAN 135 and may support position procedures/methods such as Assisted GNSS (A-GNSS), Observed Time Difference of Arrival (OTDOA), Real lime Kinematics (RTK), Precise Point Positioning (PPP), Differential GNSS (DGNSS), Enhanced Cell ID (E-CID), angle of arrival (AOA), angle of departure (AOD), and/or other position methods. The LMF 120 may process location services requests for the UE 105, e.g., received from the AMF 115 or from the GMLC 125. The LMF 120 may be connected to the AMF 115 and/or to the GMLC 125. The LMF 120 may be referred to by other names such as a Location Manager (LM), Location Function (LF), commercial LMF (CLMF), or value added LMF (VLMF). A node/system that implements the LMF 120 may additionally or alternatively implement other types of location-support modules, such as an Enhanced Serving Mobile Location Center (E-SMLC) or a Secure User Plane Location (SUPL) Location Platform (SLP). At least part of the positioning functionality (including derivation of the UE 105's location) may be performed at the UE 105 (e.g., using signal measurements obtained by the UE 105 for signals transmitted by wireless nodes such as the gNBs 110a, 110b and/or the ng-eNB 114, and/or assistance data provided to the UE 105, e.g. by the LMF 120).

The GMLC 125 may support a location request for the UE 105 received from the external client 130 and may forward such a location request to the AMF 115 for forwarding by the AMF 115 to the LMF 120 or may forward the location request directly to the LMF 120. A location response from the LMF 120 (e.g., containing a location estimate for the UE 105) may be returned to the GMLC 125 either directly or via the AMF 115 and the GMLC 125 may then return the location response (e.g., containing the location estimate) to the external client 130. The GMLC 125 is shown connected to both the AMF 115 and LMF 120, though only one of these connections may be supported by the 5GC 140 in some implementations.

As further illustrated in FIG. 1, the LMF 120 may communicate with the gNBs 110a, 110b and/or the ng-eNB 114 using a New Radio Position Protocol A (which may be referred to as NPPa or NRPPa), which may be defined in 3GPP Technical Specification (TS) 38.455. NRPPa may be the same as, similar to, or an extension of the LTE Positioning Protocol A (LPPa) defined in 3GPP TS 36.455, with NRPPa messages being transferred between the gNB 110a (or the gNB 110b) and the LMF 120, and/or between the ng-eNB 114 and the LMF 120, via the AMF 115. As further illustrated in FIG. 1, the LMF 120 and the UE 105 may communicate using an LTE Positioning Protocol (LPP), which may be defined in 3GPP TS 36.355. The LMF 120 and the UE 105 may also or instead communicate using a New Radio Positioning Protocol (which may be referred to as NPP or NRPP), which may be the same as, similar to, or an extension of LPP. Here, LPP and/or NPP messages may be transferred between the UE 105 and the LMF 120 via the AMF 115 and the serving gNB 110a, 110b or the serving ng-eNB 114 for the UE 105. For example, LPP and/or NPP messages may be transferred between the LMF 120 and the AMF 115 using a 5G Location Services Application Protocol (LCS AP) and may be transferred between the AMF 115 and the UE 105 using a 5G Non-Access Stratum (NAS) protocol. The LPP and/or NPP protocol may be used to support positioning of the UE 105 using UE-assisted and/or UE-based position methods such as A-GNSS, RTK, OTDOA and/or E-CID. The NRPPa protocol may be used to support positioning of the UE 105 using network-based position methods such as E-CID (e.g., when used with measurements obtained by the gNB 110a, 110b or the ng-eNB 114) and/or may be used by the LMF 120 to obtain location related information from the gNBs 110a, 110b and/or the ng-cNB 114, such as parameters defining directional SS transmissions from the gNBs 110a, 110b, and/or the ng-cNB 114.

With a UE-assisted position method, the UE 105 may obtain location measurements and send the measurements to a location server (e.g., the LMF 120) for computation of a location estimate for the UE 105. For example, the location measurements may include one or more of a Received Signal Strength Indication (RSSI), Round Trip signal propagation Time (RTT), Reference Signal Time Difference (RSTD), Reference Signal Received Power (RSRP) and/or Reference Signal Received Quality (RSRQ) for the gNBs 110a, 110b, the ng-eNB 114, and/or a WLAN AP. The location measurements may also or instead include measurements of GNSS pseudorange, code phase, and/or carrier phase for the SVs 190-193.

With a UE-based position method, the UE 105 may obtain location measurements (e.g., which may be the same as or similar to location measurements for a UE-assisted position method) and may compute a location of the UE 105 (e.g., with the help of assistance data received from a location server such as the LMF 120 or broadcast by the gNBs 110a, 110b, the ng-eNB 114, or other base stations or APs).

With a network-based position method, one or more base stations (e.g., the gNBs 110a, 110b, and/or the ng-eNB 114) or APs may obtain location measurements (e.g., measurements of RSSI, RTT, RSRP, RSRQ or Time Of Arrival (TOA) for signals transmitted by the UE 105) and/or may receive measurements obtained by the UE 105. The one or more base stations or APs may send the measurements to a location server (e.g., the LMF 120) for computation of a location estimate for the UE 105.

Information provided by the gNBs 110a, 110b, and/or the ng-eNB 114 to the LMF 120 using NRPPa may include timing and configuration information for directional SS transmissions and location coordinates. The LMF 120 may provide some or all of this information to the UE 105 as assistance data in an LPP and/or NPP message via the NG-RAN 135 and the 5GC 140.

An LPP or NPP message sent from the LMF 120 to the UE 105 may instruct the UE 105 to do any of a variety of things depending on desired functionality. For example, the LPP or NPP message could contain an instruction for the UE 105 to obtain measurements for GNSS (or A-GNSS), WLAN, E-CID, and/or OTDOA (or some other position method). In the case of E-CID, the LPP or NPP message may instruct the UE 105 to obtain one or more measurement quantities (e.g., beam ID, beam width, mean angle, RSRP, RSRQ measurements) of directional signals transmitted within particular cells supported by one or more of the gNBs 110a, 110b, and/or the ng-eNB 114 (or supported by some other type of base station such as an eNB or WiFi AP). The UE 105 may send the measurement quantities back to the LMF 120 in an LPP or NPP message (e.g., inside a 5G NAS message) via the serving gNB 110a (or the serving ng-eNB 114) and the AMF 115.

As noted, while the communication system 100 is described in relation to 5G technology, the communication system 100 may be implemented to support other communication technologies, such as GSM, WCDMA, LTE, etc., that are used for supporting and interacting with mobile devices such as the UE 105 (e.g., to implement voice, data, positioning, and other functionalities). In some such embodiments, the 5GC 140 may be configured to control different air interfaces. For example, the 5GC 140 may be connected to a WLAN using a Non-3GPP InterWorking Function (N3IWF, not shown FIG. 1) in the 5GC 150. For example, the WLAN may support IEEE 802.11 WiFi access for the UE 105 and may comprise one or more WiFi APs. Here, the N3IWF may connect to the WLAN and to other elements in the 5GC 140 such as the AMF 115. In some embodiments, both the NG-RAN 135 and the 5GC 140 may be replaced by one or more other RANs and one or more other core networks. For example, in an EPS, the NG-RAN 135 may be replaced by an E-UTRAN containing eNBs and the 5GC 140 may be replaced by an EPC containing a Mobility Management Entity (MME) in place of the AMF 115, an E-SMLC in place of the LMF 120, and a GMLC that may be similar to the GMLC 125. In such an EPS, the E-SMLC may use LPPa in place of NRPPa to send and receive location information to and from the eNBs in the E-UTRAN and may use LPP to support positioning of the UE 105. In these other embodiments, positioning of the UE 105 using directional PRSs may be supported in an analogous manner to that described herein for a 5G network with the difference that functions and procedures described herein for the gNBs 110a, 110b, the ng-eNB 114, the AMF 115, and the LMF 120 may, in some cases, apply instead to other network elements such eNBs, WiFi APs, an MME, and an E-SMLC.

As noted, in some embodiments, positioning functionality may be implemented, at least in part, using the directional SS beams, sent by base stations (such as the gNBs 110a, 110b, and/or the ng-eNB 114) that are within range of the UE whose position is to be determined (e.g., the UE 105 of FIG. 1). The UE may, in some instances, use the directional SS beams from a plurality of base stations (such as the gNBs 110a, 110b, the ng-eNB 114, etc.) to compute the UE's position.

Figure 2:
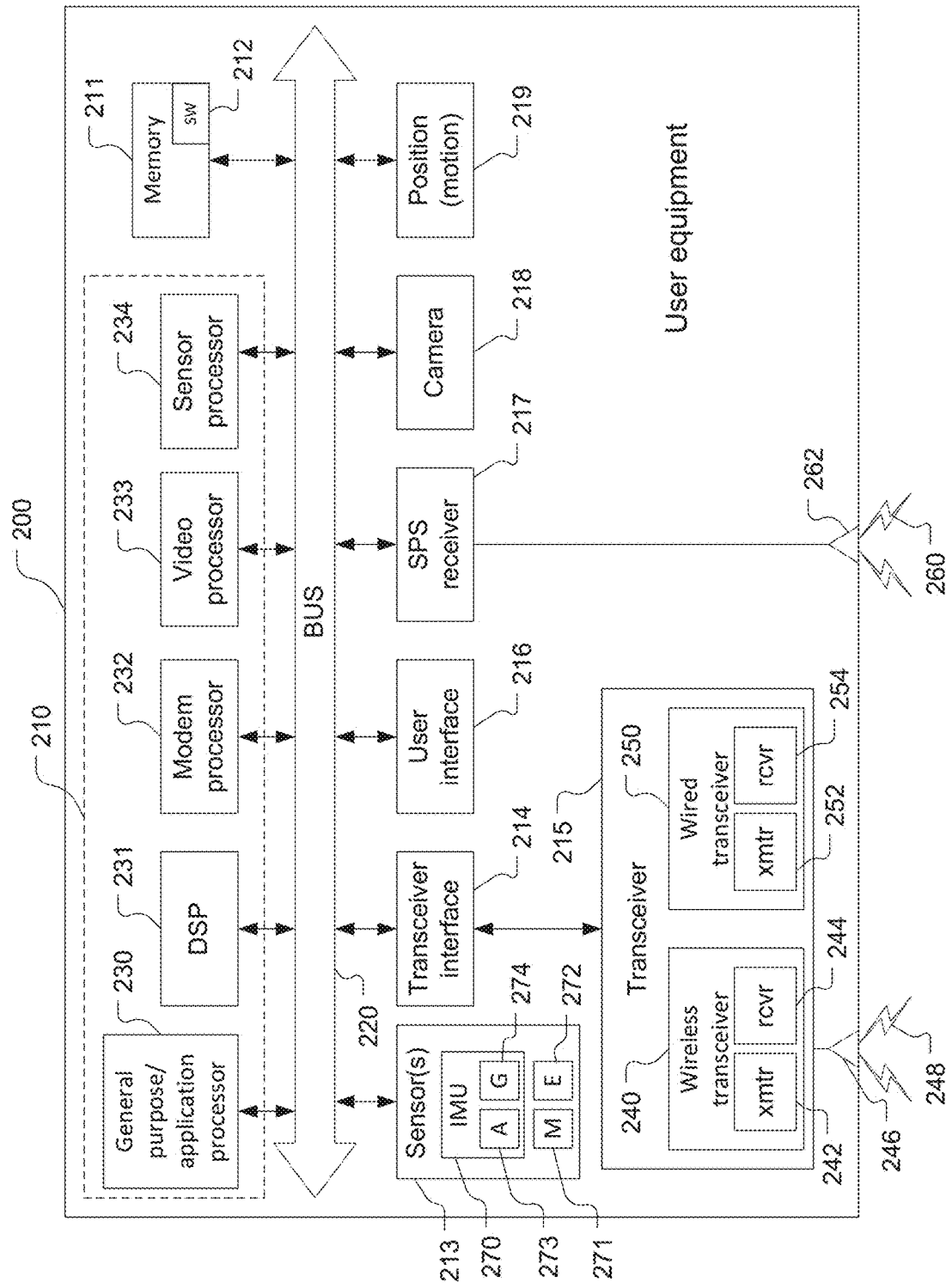
FIG. 2 is a block diagram of components of an example user equipment shown in FIG. 1.

Referring also to FIG. 2, a UE 200 is an example of the UE 105 and comprises a computing platform including a processor 210, memory 211 including software (SW) 212, one or more sensors 213, a transceiver interface 214 for a transceiver 215, a user interface 216, a Satellite Positioning System (SPS) receiver 217, a camera 218, and a position (motion) device 219. The processor 210, the memory 211, the sensor(s) 213, the transceiver interface 214, the user interface 216, the SPS receiver 217, the camera 218, and the position (motion) device 219 may be communicatively coupled to each other by a bus 220 (which may be configured, e.g., for optical and/or electrical communication). One or more of the shown processor-readable instructions apparatus (e.g., the camera 218, the position (motion) device 219, and/or one or more of the sensor(s) 213, etc.) may be omitted from the UE 200. The processor 210 may include one or more intelligent hardware devices, e.g., a central processing unit (CPU), a microcontroller, an application specific integrated circuit (ASIC), etc. The processor 210 may comprise multiple processors including a general-purpose/application processor 230, a Digital Signal Processor (DSP) 231, a modem processor 232, a video processor 233, and/or a sensor processor 234. One or more of the processors 230-234 may comprise multiple devices (e.g., multiple processors). For example, the sensor processor 234 may comprise, e.g., processors for radar, ultrasound, and/or lidar, etc. The modem processor 232 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 200 for connectivity. The memory 211 is a non-transitory storage medium that may include random access memory (RAM), flash memory, disc memory, and/or read-only memory (ROM), etc. The memory 211 stores the software 212 which may be processor-readable, processor-executable software code containing instructions that are configured to, when executed, cause the processor 210 to perform various functions described herein. Alternatively, the software 212 may not be directly executable by the processor 210 but may be configured to cause the processor 210, e.g., when compiled and executed, to perform the functions. The description may refer only to the processor 210 performing a function, but this includes other implementations such as where the processor 210 executes software and/or firmware. The description may refer to the processor 210 performing a function as shorthand for one or more of the processors 230-234 performing the function. The description may refer to the UE 200 performing a function as shorthand for one or more appropriate components of the UE 200 performing the function. The processor 210 may include a memory with stored instructions in addition to and/or instead of the memory 211. Functionality of the processor 210 is discussed more fully below.

The configuration of the UE 200 shown in FIG. 2 is an example and not limiting of the invention, including the claims, and other configurations may be used. For example, an example configuration of the UE includes one or more of the processors 230-234 of the processor 210, the memory 211, and the wireless transceiver 240. Other example configurations include one or more of the processors 230-234 of the processor 210, the memory 211, the wireless transceiver 240, and one or more of the sensor(s) 213, the user interface 216, the SPS receiver 217, the camera 218, the PMD 219, and/or the wired transceiver 250.

The UE 200 may comprise the modem processor 232 that may be capable of performing baseband processing of signals received and down-converted by the transceiver 215 and/or the SPS receiver 217. The modem processor 232 may perform baseband processing of signals to be upconverted for transmission by the transceiver 215. Also or alternatively, baseband processing may be performed by the processor 230 and/or the DSP 231. Other configurations, however, may be used to perform baseband processing.

The UE 200 may include the sensor(s) 213 that may include, for example, an Inertial Measurement Unit (IMU) 270, one or more magnetometers 271, and/or one or more environment sensors 272. The IMU 270 may comprise one or more inertial sensors, for example, one or more accelerometers 273 (e.g., collectively responding to acceleration of the UE 200 in three dimensions) and/or one or more gyroscopes 274. The magnetometer(s) may provide measurements to determine orientation (e.g., relative to magnetic north and/or true north) that may be used for any of a variety of purposes, e.g., to support one or more compass applications. The environment sensor(s) 272 may comprise, for example, one or more temperature sensors, one or more barometric pressure sensors, one or more ambient light sensors, one or more camera imagers, and/or one or more microphones, etc. The sensor(s) 213 may generate analog and/or digital signals indications of which may be stored in the memory 211 and processed by the DSP 231 and/or the processor 230 in support of one or more applications such as, for example, applications directed to positioning and/or navigation operations.

The sensor(s) 213 may be used in relative location measurements, relative location determination, motion determination, etc. Information detected by the sensor(s) 213 may be used for motion detection, relative displacement, dead reckoning, sensor-based location determination, and/or sensor-assisted location determination. The sensor(s) 213 may be useful to determine whether the UE 200 is fixed (stationary) or mobile and/or whether to report certain useful information to the LMF 120 regarding the mobility of the UE 200. For example, based on the information obtained/measured by the sensor(s) 213, the UE 200 may notify/report to the LMF 120 that the UE 200 has detected movements or that the UE 200 has moved, and report the relative displacement/distance (e.g., via dead reckoning, or sensor-based location determination, or sensor-assisted location determination enabled by the sensor(s) 213). In another example, for relative positioning information, the sensors/IMU can be used to determine the angle and/or orientation of the other device with respect to the UE 200, etc.

The IMU 270 may be configured to provide measurements about a direction of motion and/or a speed of motion of the UE 200, which may be used in relative location determination. For example, the one or more accelerometers 273 and/or the one or more gyroscopes 274 of the IMU 270 may detect, respectively, a linear acceleration and a speed of rotation of the UE 200. The linear acceleration and speed of rotation measurements of the UE 200 may be integrated over time to determine an instantaneous direction of motion as well as a displacement of the UE 200. The instantaneous direction of motion and the displacement may be integrated to track a location of the UE 200. For example, a reference location of the UE 200 may be determined, e.g., using the SPS receiver 217 (and/or by some other means) for a moment in time and measurements from the accelerometer(s) 273 and gyroscope(s) 274 taken after this moment in time may be used in dead reckoning to determine present location of the UE 200 based on movement (direction and distance) of the UE 200 relative to the reference location.

The magnetometer(s) 271 may determine magnetic field strengths in different directions which may be used to determine orientation of the UE 200. For example, the orientation may be used to provide a digital compass for the UE 200. The magnetometer(s) 271 may include a two-dimensional magnetometer configured to detect and provide indications of magnetic field strength in two orthogonal dimensions. Also or alternatively, the magnetometer(s) 271 may include a three-dimensional magnetometer configured to detect and provide indications of magnetic field strength in three orthogonal dimensions. The magnetometer(s) 271 may provide means for sensing a magnetic field and providing indications of the magnetic field, e.g., to the processor 210.

The transceiver 215 may include a wireless transceiver 240 and a wired transceiver 250 configured to communicate with other devices through wireless connections and wired connections, respectively. For example, the wireless transceiver 240 may include a transmitter 242 and receiver 244 coupled to one or more antennas 246 for transmitting (e.g., on one or more uplink channels) and/or receiving (e.g., on one or more downlink channels) wireless signals 248 and transducing signals from the wireless signals 248 to wired (e.g., electrical and/or optical) signals and from wired (e.g., electrical and/or optical) signals to the wireless signals 248. Thus, the transmitter 242 may include multiple transmitters that may be discrete components or combined/integrated components, and/or the receiver 244 may include multiple receivers that may be discrete components or combined/integrated components. The wireless transceiver 240 may be configured to communicate signals (e.g., with TRPs and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. New Radio may use mm-wave frequencies and/or sub-6 GHz frequencies. The wired transceiver 250 may include a transmitter 252 and a receiver 254 configured for wired communication, e.g., with the network 135 to send communications to, and receive communications from, the gNB 110a, for example. The transmitter 252 may include multiple transmitters that may be discrete components or combined/integrated components, and/or the receiver 254 may include multiple receivers that may be discrete components or combined/integrated components. The wired transceiver 250 may be configured, e.g., for optical communication and/or electrical communication. The transceiver 215 may be communicatively coupled to the transceiver interface 214, e.g., by optical and/or electrical connection. The transceiver interface 214 may be at least partially integrated with the transceiver 215.

The user interface 216 may comprise one or more of several devices such as, for example, a speaker, microphone, display device, vibration device, keyboard, touch screen, etc. The user interface 216 may include more than one of any of these devices. The user interface 216 may be configured to enable a user to interact with one or more applications hosted by the UE 200. For example, the user interface 216 may store indications of analog and/or digital signals in the memory 211 to be processed by DSP 231 and/or the general-purpose processor 230 in response to action from a user. Similarly, applications hosted on the UE 200 may store indications of analog and/or digital signals in the memory 211 to present an output signal to a user. The user interface 216 may include an audio input/output (I/O) device comprising, for example, a speaker, a microphone, digital-to-analog circuitry, analog-to-digital circuitry, an amplifier and/or gain control circuitry (including more than one of any of these devices). Other configurations of an audio I/O device may be used. Also or alternatively, the user interface 216 may comprise one or more touch sensors responsive to touching and/or pressure, e.g., on a keyboard and/or touch screen of the user interface 216.

The SPS receiver 217 (e.g., a Global Positioning System (GPS) receiver) may be capable of receiving and acquiring SPS signals 260 via an SPS antenna 262. The antenna 262 is configured to transduce the wireless signals 260 to wired signals, e.g., electrical or optical signals, and may be integrated with the antenna 246. The SPS receiver 217 may be configured to process, in whole or in part, the acquired SPS signals 260 for estimating a location of the UE 200. For example, the SPS receiver 217 may be configured to determine location of the UE 200 by trilateration using the SPS signals 260. The general-purpose processor 230, the memory 211, the DSP 231 and/or one or more specialized processors (not shown) may be utilized to process acquired SPS signals, in whole or in part, and/or to calculate an estimated location of the UE 200, in conjunction with the SPS receiver 217. The memory 211 may store indications (e.g., measurements) of the SPS signals 260 and/or other signals (e.g., signals acquired from the wireless transceiver 240) for use in performing positioning operations. The general-purpose processor 230, the DSP 231, and/or one or more specialized processors, and/or the memory 211 may provide or support a location engine for use in processing measurements to estimate a location of the UE 200.

The UE 200 may include the camera 218 for capturing still or moving imagery. The camera 218 may comprise, for example, an imaging sensor (e.g., a charge coupled device or a CMOS imager), a lens, analog-to-digital circuitry, frame buffers, etc. Additional processing, conditioning, encoding, and/or compression of signals representing captured images may be performed by the general-purpose processor 230 and/or the DSP 231. Also or alternatively, the video processor 233 may perform conditioning, encoding, compression, and/or manipulation of signals representing captured images. The video processor 233 may decode/decompress stored image data for presentation on a display device (not shown), e.g., of the user interface 216.

The position (motion) device (PMD) 219 may be configured to determine a position and possibly motion of the UE 200. For example, the PMD 219 may communicate with, and/or include some or all of, the SPS receiver 217. The PMD 219 may also or alternatively be configured to determine location of the UE 200 using terrestrial-based signals (e.g., at least some of the signals 248) for trilateration, for assistance with obtaining and using the SPS signals 260, or both. The PMD 219 may be configured to use one or more other techniques (e.g., relying on the UE's self-reported location (e.g., part of the UE's position beacon)) for determining the location of the UE 200, and may use a combination of techniques (e.g., SPS and terrestrial positioning signals) to determine the location of the UE 200. The PMD 219 may include one or more of the sensors 213 (e.g., gyroscope(s), accelerometer(s), magnetometer(s), etc.) that may sense orientation and/or motion of the UE 200 and provide indications thereof that the processor 210 (e.g., the processor 230 and/or the DSP 231) may be configured to use to determine motion (e.g., a velocity vector and/or an acceleration vector) of the UE 200. The PMD 219 may be configured to provide indications of uncertainty and/or error in the determined position and/or motion.

Figure 3:
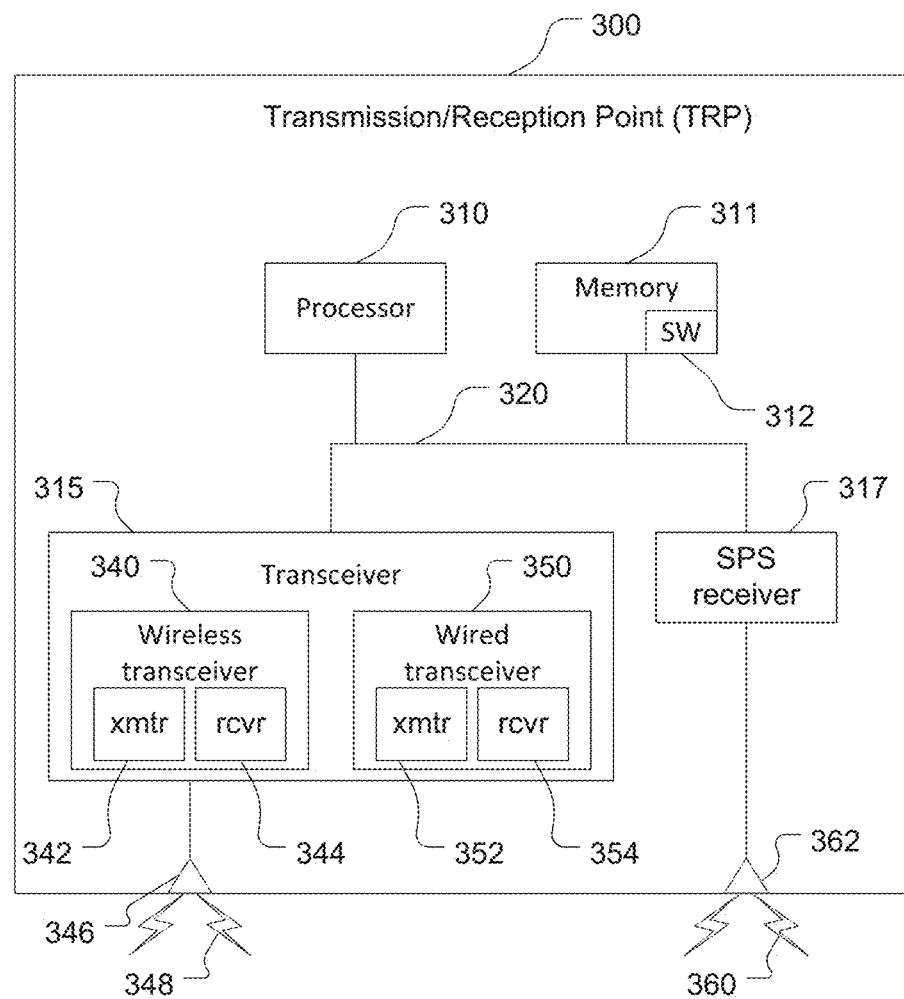
FIG. 3 is a block diagram of components of an example transmission/reception point shown in FIG. 1.
Figure 4:
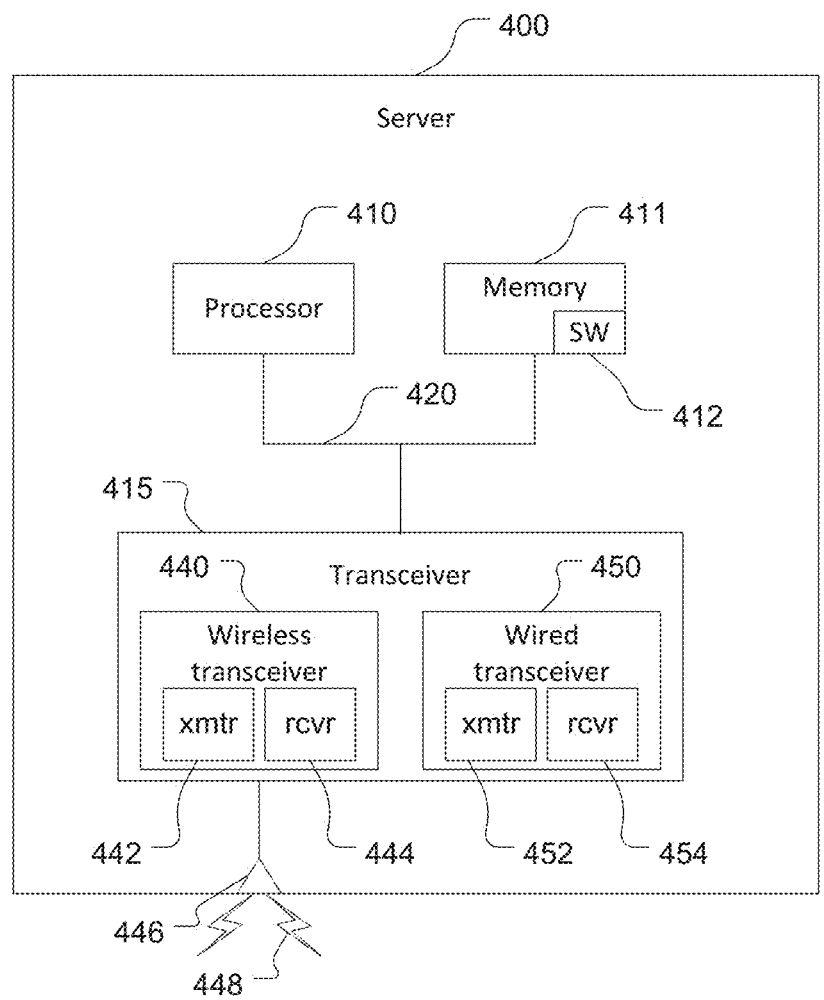
FIG. 4 is a block diagram of components of an example server shown in FIG. 1.

Referring also to FIG. 3, an example of a TRP 300 of the BSs 110a, 110b, 114 comprises a computing platform including a processor 310, memory 311 including software (SW) 312, a transceiver 315, and (optionally) an SPS receiver 317. The processor 310, the memory 311, the transceiver 315, and the SPS receiver 317 may be communicatively coupled to each other by a bus 320 (which may be configured, e.g., for optical and/or electrical communication). One or more of the shown apparatus (e.g., a wireless interface and/or the SPS receiver 317) may be omitted from the TRP 300. The SPS receiver 317 may be configured similarly to the SPS receiver 217 to be capable of receiving and acquiring SPS signals 360 via an SPS antenna 362. The processor 310 may include one or more intelligent hardware devices, e.g., a central processing unit (CPU), a microcontroller, an application specific integrated circuit (ASIC), etc. The processor 310 may comprise multiple processors (e.g., including a general-purpose/application processor, a DSP, a modem processor, a video processor, and/or a sensor processor as shown in FIG. 4). The memory 311 is a non-transitory storage medium that may include random access memory (RAM)), flash memory, disc memory, and/or read-only memory (ROM), etc. The memory 311 stores the software 312 which may be processor-readable, processor-executable software code containing instructions that are configured to, when executed, cause the processor 310 to perform various functions described herein. Alternatively, the software 312 may not be directly executable by the processor 310 but may be configured to cause the processor 310, e.g., when compiled and executed, to perform the functions. The description may refer only to the processor 310 performing a function, but this includes other implementations such as where the processor 310 executes software and/or firmware. The description may refer to the processor 310 performing a function as shorthand for one or more of the processors contained in the processor 310 performing the function. The description may refer to the TRP 300 performing a function as shorthand for one or more appropriate components of the TRP 300 (and thus of one of the BSs 110a, 110b, 114) performing the function. The processor 310 may include a memory with stored instructions in addition to and/or instead of the memory 311. Functionality of the processor 310 is discussed more fully below.

The transceiver 315 may include a wireless transceiver 340 and a wired transceiver 350 configured to communicate with other devices through wireless connections and wired connections, respectively. For example, the wireless transceiver 340 may include a transmitter 342 and receiver 344 coupled to one or more antennas 346 for transmitting (e.g., on one or more uplink channels) and/or receiving (e.g., on one or more downlink channels) wireless signals 348 and transducing signals from the wireless signals 348 to wired (e.g., electrical and/or optical) signals and from wired (e.g., electrical and/or optical) signals to the wireless signals 348. Thus, the transmitter 342 may include multiple transmitters that may be discrete components or combined/integrated components, and/or the receiver 344 may include multiple receivers that may be discrete components or combined/integrated components. The wireless transceiver 340 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 350 may include a transmitter 352 and a receiver 354 configured for wired communication, e.g., with the network 140 to send communications to, and receive communications from, the LMF 120, for example. The transmitter 352 may include multiple transmitters that may be discrete components or combined/integrated components, and/or the receiver 354 may include multiple receivers that may be discrete components or combined/integrated components. The wired transceiver 350 may be configured, e.g., for optical communication and/or electrical communication.

The configuration of the TRP 300 shown in FIG. 3 is an example and not limiting of the invention, including the claims, and other configurations may be used. For example, the description herein discusses that the TRP 300 is configured to perform or performs several functions, but one or more of these functions may be performed by the LMF 120 and/or the UE 200 (i.e., the LMF 120 and/or the UE 200 may be configured to perform one or more of these functions).

Referring also to FIG. 4, an example of the LMF 120 comprises a computing platform including a processor 410, memory 411 including software (SW) 412, and a transceiver 415. The processor 410, the memory 411, and the transceiver 415 may be communicatively coupled to each other by a bus 420 (which may be configured, e.g., for optical and/or electrical communication). One or more of the shown apparatus (e.g., a wireless interface) may be omitted from the server 400. The processor 410 may include one or more intelligent hardware devices, e.g., a central processing unit (CPU), a microcontroller, an application specific integrated circuit (ASIC), etc. The processor 410 may comprise multiple processors (e.g., including a general-purpose/application processor, a DSP, a modem processor, a video processor, and/or a sensor processor as shown in FIG. 4). The memory 411 is a non-transitory storage medium that may include random access memory (RAM)), flash memory, disc memory, and/or read-only memory (ROM), etc. The memory 411 stores the software 412 which may be processor-readable, processor-executable software code containing instructions that are configured to, when executed, cause the processor 410 to perform various functions described herein. Alternatively, the software 412 may not be directly executable by the processor 410 but may be configured to cause the processor 410, e.g., when compiled and executed, to perform the functions. The description may refer only to the processor 410 performing a function, but this includes other implementations such as where the processor 410 executes software and/or firmware. The description may refer to the processor 410 performing a function as shorthand for one or more of the processors contained in the processor 410 performing the function. The description may refer to the server 400 (or the LMF 120) performing a function as shorthand for one or more appropriate components of the server 400 (e.g., the LMF 120) performing the function. The processor 410 may include a memory with stored instructions in addition to and/or instead of the memory 411. Functionality of the processor 410 is discussed more fully below.

The transceiver 415 may include a wireless transceiver 440 and a wired transceiver 450 configured to communicate with other devices through wireless connections and wired connections, respectively. For example, the wireless transceiver 440 may include a transmitter 442 and receiver 444 coupled to one or more antennas 446 for transmitting (e.g., on one or more uplink channels) and/or receiving (e.g., on one or more downlink channels) wireless signals 448 and transducing signals from the wireless signals 448 to wired (e.g., electrical and/or optical) signals and from wired (e.g., electrical and/or optical) signals to the wireless signals 448. Thus, the transmitter 442 may include multiple transmitters that may be discrete components or combined/integrated components, and/or the receiver 444 may include multiple receivers that may be discrete components or combined/integrated components. The wireless transceiver 440 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®. Zigbee etc. The wired transceiver 450 may include a transmitter 452 and a receiver 454 configured for wired communication, e.g., with the network 135 to send communications to, and receive communications from, the TRP 300, for example. The transmitter 452 may include multiple transmitters that may be discrete components or combined/integrated components, and/or the receiver 454 may include multiple receivers that may be discrete components or combined/integrated components. The wired transceiver 450 may be configured, e.g., for optical communication and/or electrical communication.

The configuration of the server 400 shown in FIG. 4 is an example and not limiting of the invention, including the claims, and other configurations may be used. For example, the wireless transceiver 440 may be omitted. Also or alternatively, the description herein discusses that the server 400 is configured to perform or performs several functions, but one or more of these functions may be performed by the TRP 300 and/or the UE 200 (i.e., the TRP 300 and/or the UE 200 may be configured to perform one or more of these functions).

Figure 5:
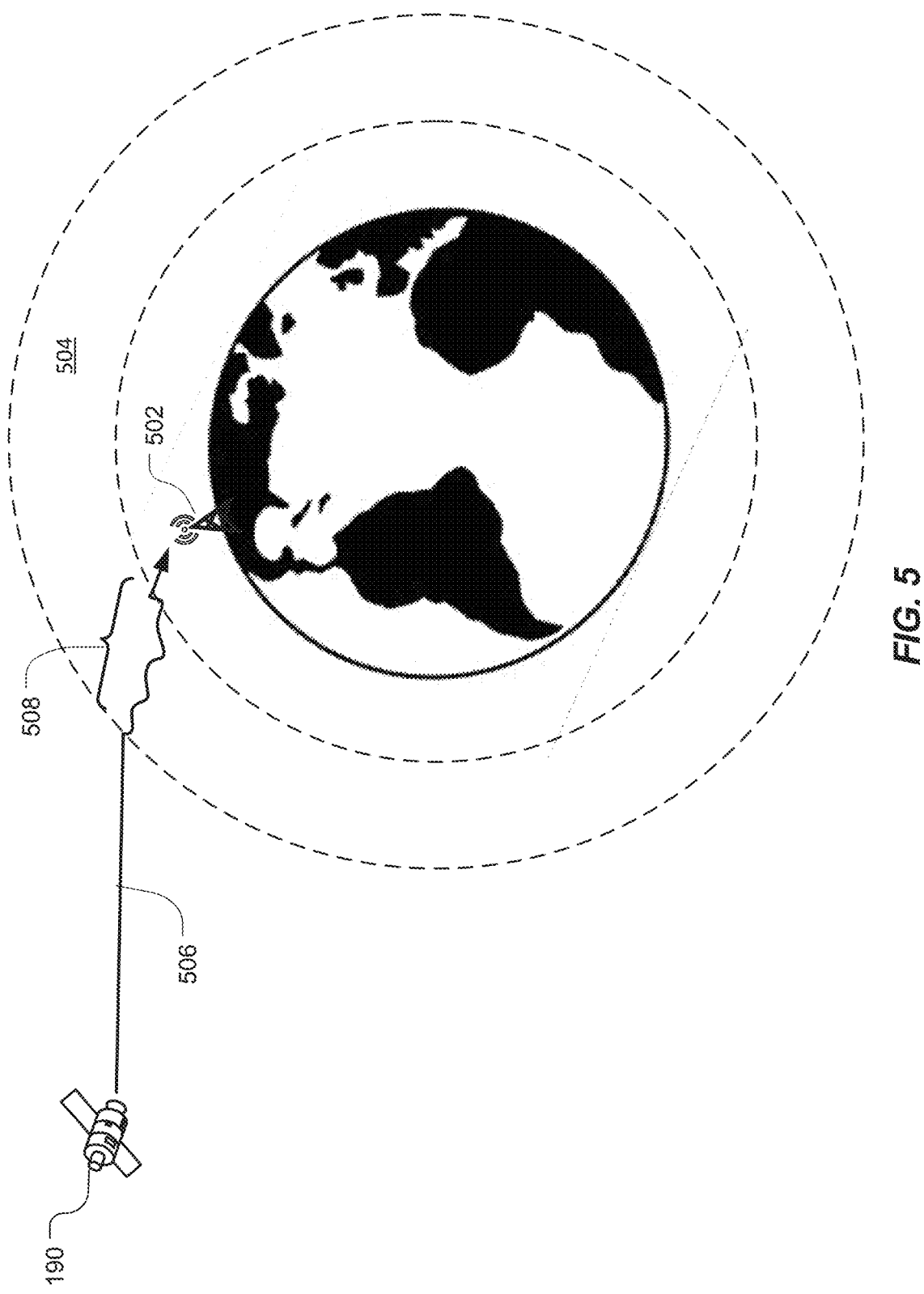
FIG. 5 is a conceptual diagram of ionospheric delay of a satellite transmission.

Referring to FIG. 5, a conceptual diagram of ionospheric delay of a satellite transmission is shown. Communications between an earth bound station 502 and a satellite, such as the SV 190, must travel through an area of the ionosphere 504. The ionosphere 504 may be generally defined as a region between 50 and 1000 kilometers above the earth, but the region may not be strictly defined. The D region of the ionosphere 504 may extend from about 50 km to 90 km. The D region may have little impact on GNSS signals and may dissipate at night. The E region may be between 90 km and 120 km and may cause a GNSS signal to scintillate. The F region extends from about 120 km to 1000 km and may have a significant impact on GNSS signals because it contains the most concentrated ionization in the atmosphere. In the daylight hours, the F layer may be further divided into F1 and F2. F2 is the most variable. The severity of the ionosphere's effect on a GNSS signal 506 depends on the amount of time 508 that a signal spends traveling through it. The distance may be estimated with a slant factor based on the elevation of the SV. The signal 506 originating from the SV 190, which is near the station's 502 horizon, must pass through a larger amount of the ionosphere 504 to reach the receiver than does a signal from a satellite near the station's 502 zenith. In general, the longer the signal 506 is in the ionosphere, the greater impact the ionosphere will have.

Figure 6:
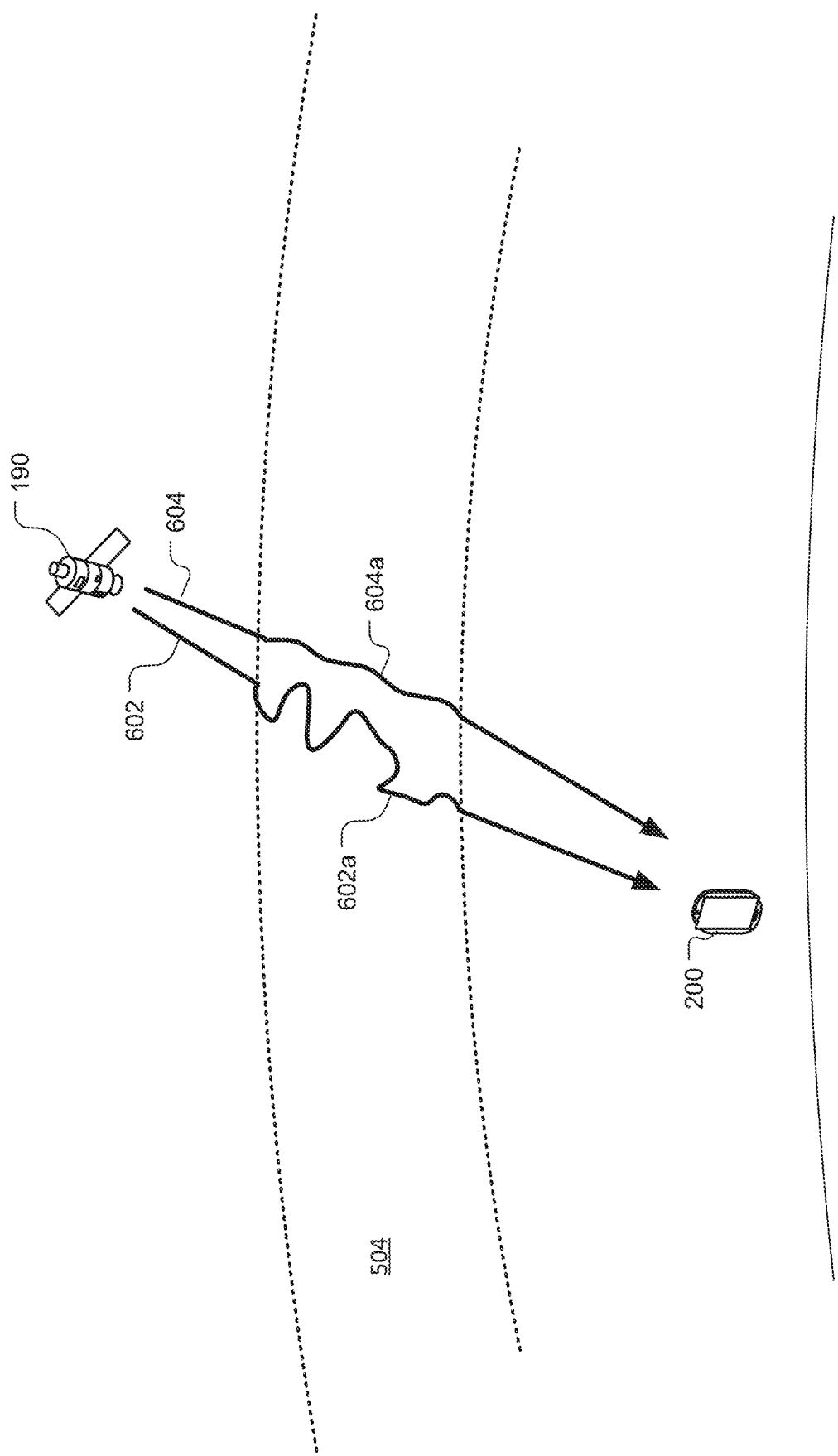
FIG. 6 is a conceptual diagram of ionospheric delay on a first frequency and a second frequency.

Referring to FIG. 6, with further reference to FIG. 5, a conceptual diagram of ionospheric delay on a first frequency and a second frequency is shown. The SV 190 may be configured to transmit signals on several different frequencies such as, for example, a pair of frequencies including a signal on a first frequency 602 and a signal on a second frequency 604. The UE 200, including the SPS receiver 217, is configured to receive the signals on the first and the second frequencies 602, 604. In general, the ionosphere 504 is dispersive and the apparent time delay contributed by the ionosphere depends on the frequency of the signal. For example, the ionosphere 504 may have a first impact 602a on the first signal at the first frequency 602, and a second impact 604a on the second signal at the second frequency 604. The dispersive property of the ionosphere 504 may cause the codes (e.g., the modulations on the carrier wave), to be impacted differently than the carrier wave during the signals trips through the ionosphere 504. For example, the P code, the C/A code, the navigation message, and all the other codes may appear to be delayed, or slowed, affected by what is known as the group delay. The carrier wave may then appear to speed up in the ionosphere 504. The impact on the carrier wave is known as the phase delay and/or phase advancement. This means that a range from the satellite 190 to the UE 200 determined by a code observation may be too long and a range determined by a carrier observation may be too short.

The apparent time delay caused by the ionosphere 504 may be greater for a lower frequency carrier wave (e.g., the first frequency) than it is for a higher frequency wave (e.g., the second frequency 604). That means that L1, 1575.42 MHz, is impacted less than L2, 1227.60 MHz, and L2 is impacted less than L5, 1176.45 MHz. The separations between the L1 and L2 frequencies (347.82 MHz), the L1 and L5 frequencies (398.97 MHz) and even the L2 and L5 frequencies (51.15 MHz) are large enough to facilitate estimation of the ionospheric group delay. The UE 200 may be configured to track multiple frequencies to model and remove a significant portion of the ionospheric bias. Prior techniques to compensate for the ionospheric delay include ionospheric delay models broadcasted by the SV 190, or by a satellite based augmentation system (SBAS). Such solutions, however, may have models which do not apply to the location of the UE 200 (e.g., global models), may require frequent ionospheric delay data decode from SBAS satellites, or may be out of date (e.g., stale) because of delays in generating and propagating the models. Some solutions may utilize the measurements between signals on two frequencies based on linear combinations of ranging measurements made on the different frequencies. These solutions, however, may amplify noise and multipath effects in the measurements, and requires the dual frequency measurements made in the same time epoch.

Figure 7:
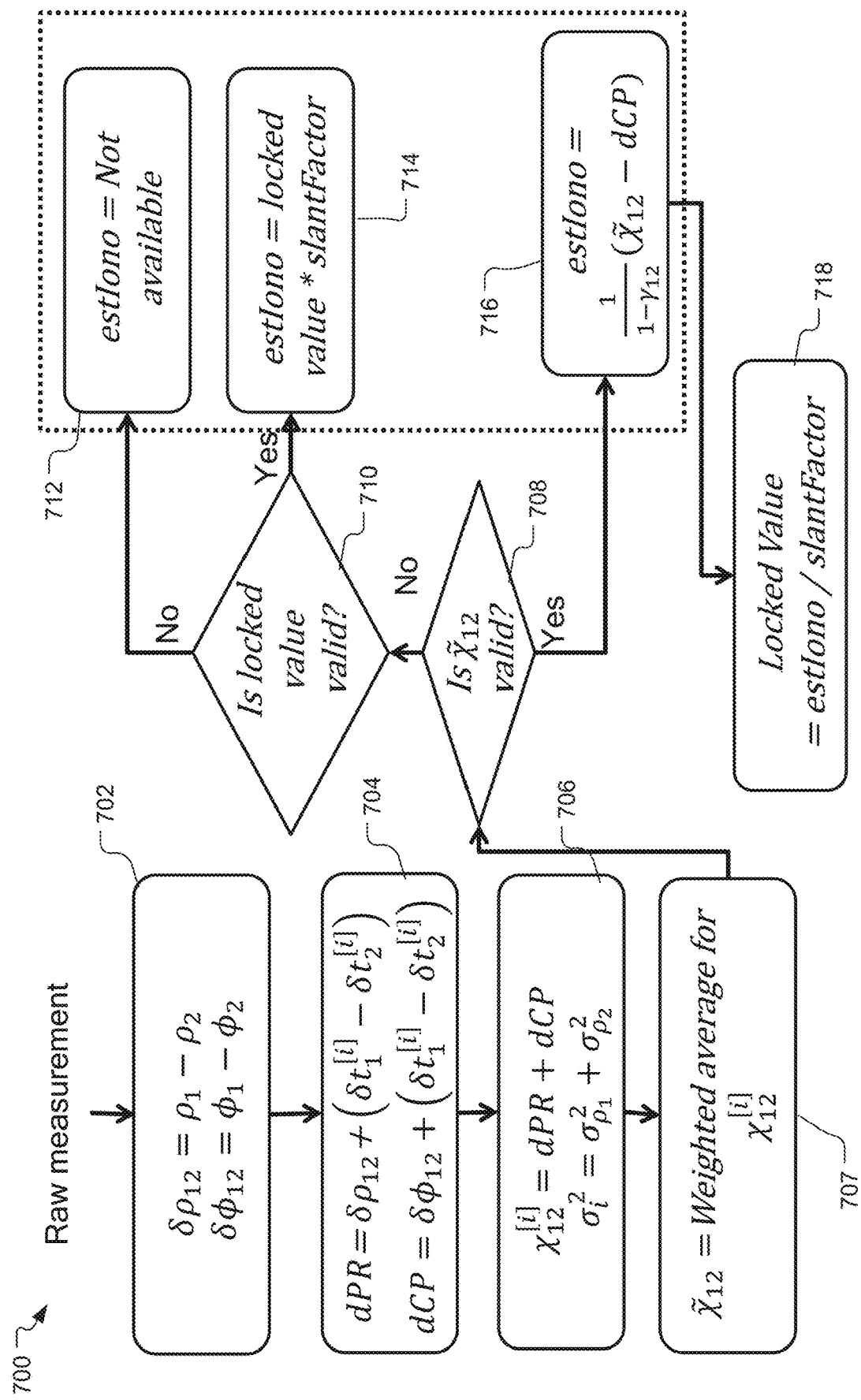
FIG. 7 is a process flow diagram of an example method for estimating an ionospheric delay.

Referring to FIG. 7, with further reference to FIG. 6, a method 700 for estimating an ionospheric delay includes the stages shown. The method 700 is, however, an example only and not limiting. The method 700 may be altered, e.g., by having stages added, removed, rearranged, combined, performed concurrently, and/or having single stages split into multiple stages. For example, one or more stages may occur before, and/or one or more stages may occur after, the stages shown in FIG. 7.

At stage 702, the method includes obtaining raw measurements from a satellite and determining a plurality of pseudorange and carrier-phase measurements. The UE 200 is a means for obtaining raw measurements from a satellite. In an example, the SV 190 may transmit signals on a plurality of frequencies including at least a pair of frequencies such as the first signal 602 on a first frequency and a second signal 604 on a second frequency. The pseudorange and carrier-phase measurements may be based on GNSS models as known in the art. For example, in general, a pseudorange measurement $\rho_1^{[i]}$ to a satellite [i] on frequency $f_1$ can be modeled as:

$$\rho_1^{[i]} = r^{[i]} + (\delta t_u - \delta t_1^{[i]}) \cdot c + B_1 + I_1^{[i]} + T^{[i]} + \in_{\rho_1}^{[i]} \quad (1)$$

where:
$r^{[i]}$ is the true range between satellite-[i] and user position.
$\delta t_u$ is the common bias in user equipment.
$\delta t_1^{[i]}$ is the satellite clock bias for satellite-[i] including any satellite group-delay on frequency $f_1$.
c is the speed of light.
$B_1$ is the additional bias in user equipment common for measurements made on frequency $f_1$.
$I^{[i]}$ is the ionospheric delay affecting the signal from satellite-[i] on frequency $f_1$.
$T^{[i]}$ is the delay introduced in signal from satellite-[i] by troposphere and is frequency-independent.

$\epsilon_{\rho_1}{}^{[i]}$ is to account for noise and any unmodeled effects.
The carrier-phase measurement may be modeled as:

$$\phi_1{}^{[i]}=r^{[i]}+(\delta t_u-\delta t_1{}^{[i]})\cdot c+b_1-I_1{}^{[i]}+T^{[i]}+\epsilon_{\phi_1}{}^{[i]}+N_1{}^{[i]}\lambda_1 \quad (2)$$

The carrier-phase measurement model is similar to pseudorange measurement model, but with the sign flipped for ionospheric delay and with an additional term $N_1{}^{[i]}\lambda_1$.

$N_1{}^{[i]}$ is the carrier phase ambiguity (number of cycles).
$\lambda_1$ is the wavelength of signal at frequency $f_1$.
The models assume that the additional bias affecting the pseudorange ($B_1$) and the carrier-phase measurement ($b_1$) are different.

The UE 200 is configured to perform dual frequency measurements based on a pair of signals on different frequencies, such as the first frequency 602 and the second frequency 604. Measurements made on frequencies $f_1$ and $f_2$ to a satellite-[i] can be modeled as:

$$\rho_1{}^{[i]}=r^{[i]}+(\delta t_u-\delta t_1{}^{[i]})\cdot c+B_1+I_1{}^{[i]}+T^{[i]}+\epsilon_{\rho_1}{}^{[i]} \quad (3)$$

$$\rho_2{}^{[i]}=r^{[i]}+(\delta t_u-\delta t_2{}^{[i]})\cdot c+B_2+\gamma_{12}I_1{}^{[i]}+T^{[i]}+\epsilon_{\rho_2}{}^{[i]} \quad (4)$$

$$\phi_1{}^{[i]}=r^{[i]}+(\delta t_u-\delta t_1{}^{[i]})\cdot c+b_1-I_1{}^{[i]}+T^{[i]}+\epsilon_{\phi_1}{}^{[i]}+N_1{}^{[i]}\lambda_1 \quad (5)$$

$$\phi_2{}^{[i]}=r^{[i]}+(\delta t_u-\delta t_2{}^{[i]})\cdot c+b_2-\gamma_{12}I_1{}^{[i]}+T^{[i]}+\epsilon_{\phi_2}{}^{[i]}+N_2{}^{[i]}\lambda_2 \quad (6)$$

where $\gamma_{12}=f_1{}^2/f_2{}^2$ is a known constant
The method provided herein estimates $I_1{}^{[i]}$ with the dual-frequency measurement pairs available to the UE 200. Equations (3) and (4) may be combined to solve for a delta pseudorange value for each measurement pair, and equations (5) and (6) may be combined to solve for delta carrier-phase value, which can be modeled as:

$$\delta\rho_{12}{}^{[i]}=\rho_1{}^{[i]}-\rho_2{}^{[i]}=-(\delta t_1{}^{[i]}-\delta t_2{}^{[i]})\cdot c+(B_1-B_2)+(1-\gamma_{12})I_1{}^{[i]}+\epsilon_{\delta\rho}{}^{[i]} \quad (7)$$

$$\delta\phi_{12}{}^{[i]}=\phi_1{}^{[i]}-\phi_2{}^{[i]}=-(\delta t_1{}^{[i]}-\delta t_2{}^{[i]})\cdot c+(b_1-b_2)-(1-\gamma_{12})I_1{}^{[i]}+\epsilon_{\delta\phi}{}^{[i]}+N_1{}^{[i]}\lambda_1-N_2{}^{[i]}\lambda_2 \quad (8)$$

Thus, the UE 200 may utilize the pairs to determine the delta pseudorange and the delta carrier-phase associated with two frequencies from a satellite.

At stage 704, the method includes determining delta-ranges corrected for the SV clock. The corrected delta pseudorange and the corrected delta carrier-phase may be modeled as:

$$dPR = \delta\rho_{12}^{[i]} + \left(\delta t_1^{[i]} - \delta t_2^{[i]}\right)\cdot c = \underbrace{(B_1 - B_2)}_{B_{12}} + (1 - \gamma_{12})I_1^{[i]} + \epsilon_{\delta\rho} \quad (9)$$

$$dCP = \quad (10)$$

$$\delta\phi_{12}^{[i]} + \left(\delta t_1^{[i]} - \delta t_2^{[i]}\right)\cdot c = \underbrace{(b_1 - b_2)}_{b_{12}} - (1 - \gamma_{12})I_1^{[i]} + \epsilon_{\delta\phi} + N_1^{[i]}\lambda_1 - N_2^{[i]}\lambda_2$$

At stage 706, the method includes determining a divergence-free estimate of the delta-range values. The estimate may be modeled as:

$$dPR=B_{12}+(1-\gamma_{12})I_1{}^{[i]}+\epsilon_{\delta\rho} \quad (11)$$

$$dCP=b_{12}-(1-\gamma_{12})I_1{}^{[i]}+\epsilon_{\delta\phi}+N_1{}^{[i]}\lambda_1-N_2{}^{[i]}\lambda_2 \quad (12)$$

$$\chi_{12}{}^{[i]}=dPR+dCP=B_{12}+b_{12}+\epsilon_{\delta\rho}+\epsilon_{\delta\phi}+N_1{}^{[i]}\lambda_1-N_2{}^{[i]}\lambda_2 \quad (13)$$

The $\chi_{12}{}^{[i]}$ value includes the bias values $B_{12}$, $b_{12}$, $N_1{}^{[i]}$ and $N_2{}^{[i]}$ which are typically constant over time. Thus, when multiple measurements are taken over time, the values will not change.

At stage 707, the method includes determining a filtered estimate of $\bar{\chi}_{12}$ from a plurality of $\chi_{12}{}^{[i]}$ values to determine a bias estimate. In an example, a weighted average of $\chi_{12}{}^{[i]}$ may be used to obtain the filtered estimate $\bar{\chi}_{12}$. As indicated in equation (13), the combination of dPR and dCP contains only constants which do not change over time. The filtered estimate $\bar{\chi}_{12}$ may be used as the bias estimate which are the constant values required to compute the ionospheric delay. A valid bias estimate may be substituted back into the delta carrier-phase equations to compute the ionospheric delay. The filtered estimate is valid for plurality of pseudorange and carrier phase measurements available at stage 700 as well as for plurality of any pseudorange and carrier phase measurements obtained with the same carrier phase ambiguity values $N_1{}^{[i]}$ and $N_2{}^{[i]}$ (i.e., no cycle slips).

At stage 708, the method includes determining whether the filtered value of the bias estimate (i.e., $\bar{\chi}_{12}{}^{[i]}$) is valid. The UE 200 is a means for determining if the filtered value of the bias estimate is valid. A valid estimate may be based on a number of samples and achieving a constant value (e.g., with a an uncertainty level that is below a predetermined threshold). In an example, the valid weighted average may be determined based obtaining a plurality of measurements over a fixed time (e.g., 10, 20, 30, 60, 100, etc. seconds).

At stage 716, the method includes computing an ionospheric delay estimate $I_1{}^{[i]}$. The UE 200 is a means for computing the ionospheric delay estimate $I_1{}^{[i]}$. The ionospheric delay estimate is based filtered value of the bias estimate obtained in 707 and the delta-carrier phase measurement corresponding to the desired epoch:

$$\hat{I}_i^{[i]} = \frac{1}{1-\gamma_{12}}\left(\bar{\chi}_{12}^{[i]} - dCP\right) = I_1^{[i]} + \frac{B_{12}}{1-\gamma_{12}} + \epsilon_{dPR'} \quad (14)$$

The dCP value may be based on plurality of measurements obtained at stage 702, or on measurements obtained after stage 702. In an example, the measurements for the dCP value may be obtained in a different epoch from the measurements obtained at stage 702. Equation (14) may be used to compute the ionospheric delay estimate $I_1{}^{[i]}$:

$$\hat{I}_i^{[i]} = \left(\frac{dPR'}{1-\gamma_{12}}\right) = I_1^{[i]} + \frac{B_{12}}{1-\gamma_{12}} \quad (15)$$

The offset in the ionospheric delay estimate is common across specific dual-frequency pairs from the same GNSS constellation and may be absorbed in the common receiver clock bias estimate or inter-constellation bias estimate. For example, the $B_{12}$, for {L1,15} dual frequency pair is different from {L1, L2} dual frequency pair even within the same constellation. Alternatively, since $B_{12}$ is a receiver hardware bias, it may be separately estimated and calibrated by a device manufacturer.

At stage 718, the method includes locking the ionospheric delay estimate. The UE 200 is a means for locking the ionospheric delay estimate. The ionospheric delay estimate computed at stage 716 may be stored and used with a slant factor corresponding to the elevation of the satellite for subsequent measurements. In an example, the ionospheric delay estimate determined in one epoch may be used in with pseudorange and/or carrier-phase measurements obtained in another epoch.

At stage 710, the method includes determining if a previously locked ionospheric delay estimate is valid. If a new bias estimate is not valid at stage 708, a previously computed and locked ionospheric delay estimate may be used on pseudorange and carrier-phase measurements. The use of the locked ionospheric delay enables the UE 200 to coast through periods when one of the dual-frequencies are not available (i.e., the bias estimate has not been validated), or if a cycle-slip is detected on one or both frequencies requiring bias estimate to be recomputed using a new set of plurality of pseudorange and carrier phase measurements with a new carrier phase ambiguity. At stage 714, the valid locked ionospheric delay estimate may be scaled with a slant factor for the satellite and used with the obtained pseudorange and/or carrier-phase measurements. The UE 200 may compute the slant factor based on the current elevation of the satellite. If the previously locked ionospheric delay estimate is not valid, then an ionospheric delay estimate is not available at stage 712.

Figure 8:
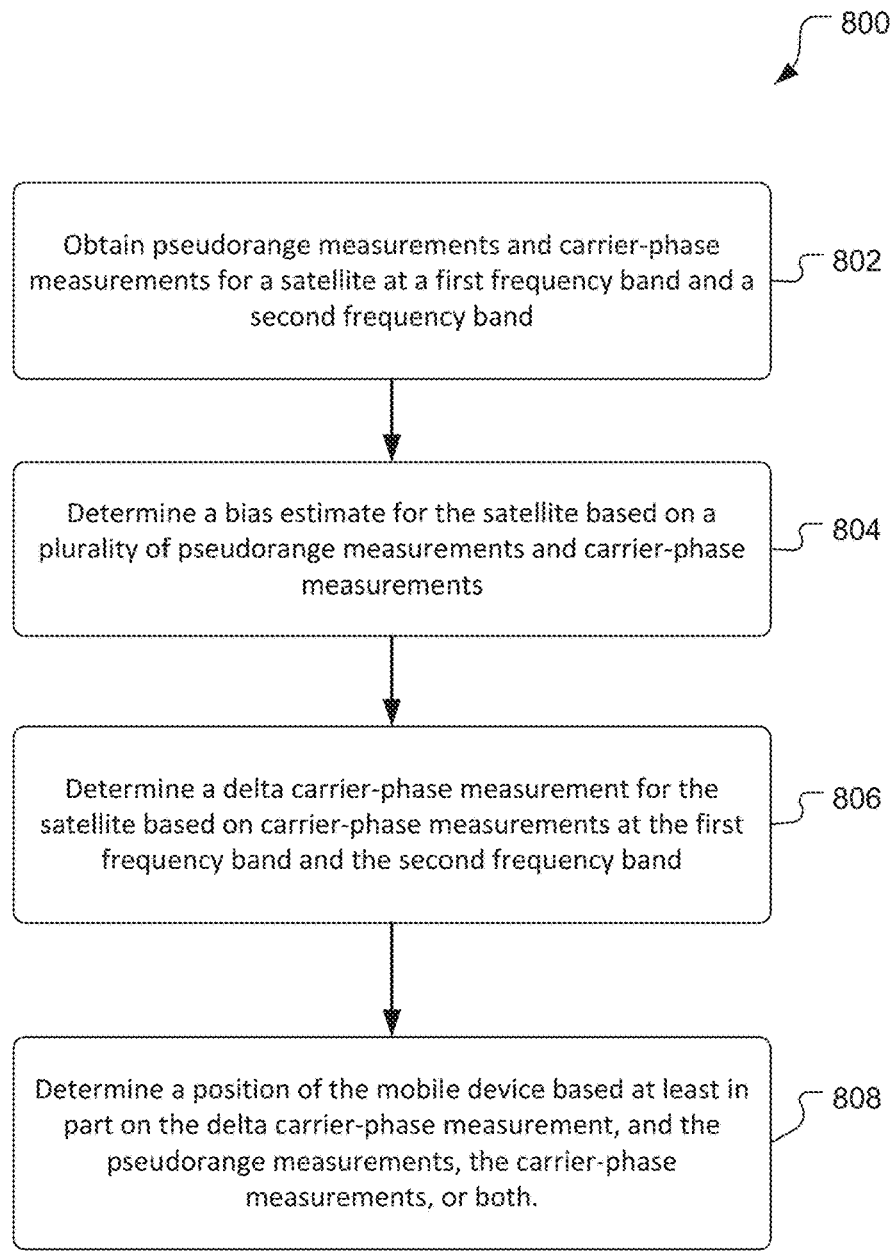
FIG. 8 is a process flow diagram of an example method for determining a position of a mobile device.

Referring to FIG. 8, with further reference to FIGS. 1-7, a method 800 of determining a position of a mobile device includes the stages shown. The method 800 is, however, an example only and not limiting. The method 800 may be altered. e.g., by having stages added, removed, rearranged, combined, performed concurrently, and/or having single stages split into multiple stages.

At stage 802, the method includes obtaining pseudorange measurements and carrier-phase measurements for a satellite at a first frequency band and a second frequency band. The UE 200 is a means for obtaining the pseudorange measurements and carrier-phase measurements. The SPS receiver 217 may be configured to receive SPS signals 260 and to process, in whole or in part, the acquired SPS signals 260. Referring to FIG. 6, the SPS signal 260 may include signals on a plurality of frequencies including at least a pair of frequencies such as the first frequency 602 and a second frequency 604. In an example, one or more of the signals may become obstructed or degraded and a first number of the plurality of pseudorange and carrier-phase measurements received on the first frequency may be greater than a second number of the plurality of pseudorange and carrier-phase measurements received on the second frequency. The method 800 is not dependent on continuous reception of both frequencies and the UE 200 may coast through periods where one of the signals is not available.

At stage 804, the method includes determining a bias estimate for the satellite based on a plurality of pseudorange measurements and carrier-phase measurements. The UE 200 is a means for determining the bias estimate. Referring to FIG. 7, at stage 706 the UE 200 may compute a plurality of delta pseudorange values as described in equation (11) and a plurality of delta carrier-phase measurements as described in equation (12). The $\chi_{12}^{[i]}$ value described at equation (13) includes the bias values $B_{12}$ and $b_{12}$, which are typically constant over time and the weighted average $\bar{\chi}_{12}$ may be used as the filtered bias estimate to compute the ionospheric delay for the satellite and the first and second frequency. In an example, determining the bias estimate may include determining a divergence-free, smoothed estimate based on the plurality of pseudorange and carrier-phase measurements. The bias estimate may be based on a weighted average of the plurality of delta-pseudorange and delta-carrier-phase measurements with the satellite based on the first frequency and the second frequency that are made over time.

At stage 806, the method includes determining a delta carrier-phase measurement for the satellite based on carrier-phase measurements at the first frequency band and the second frequency band. The UE 200 is a means for determining the delta carrier-phase measurement. The delta carrier-phase measurement is described in equation (12) and may be based on the carrier-phase measurements obtained at stage 802 or obtained later in the epoch, or in a different epoch. In an example, the bias estimate may be determined across multiple, continuous epochs and the delta carrier-phase measurement may be determined at the desired epoch.

At stage 808, the method includes determining the position of the mobile device based at least in part on the delta carrier-phase measurement, and the pseudorange measurements, the carrier-phase measurements, or both. The UE 200 is a means for determining the position of the mobile device. In an example, the UE 200 computes an estimate of the ionospheric delay for the satellite based at least in part on the delta carrier phase measurement and the bias estimate. Referring to FIG. 7, the estimate of the ionospheric delay $I_1^{[i]}$ is described in equation (15). The offset in the ionospheric delay estimate is common across dual-frequency pairs from the same GNSS constellation and may be absorbed in the common receiver clock bias estimate or inter-constellation bias estimate. The receiver hardware bias value $B_{12}$ may also be estimated and calibrated when the UE 200 is manufactured. In an example, the delta-carrier phase measurement and the estimate of the ionospheric delay at the desired epoch may correspond to the plurality of pseudorange and carrier-phase measurements received in that epoch. The delta-carrier phase measurement and the estimate of the ionospheric delay at the desired epoch may also be based on pseudorange and carrier-phase measurements received in another epoch. For example, a bias estimate can be obtained using a set of measurements, and an ionospheric delay estimate may be computed either for measurements in the same set or measurements obtained in a different epoch.

Figure 9:
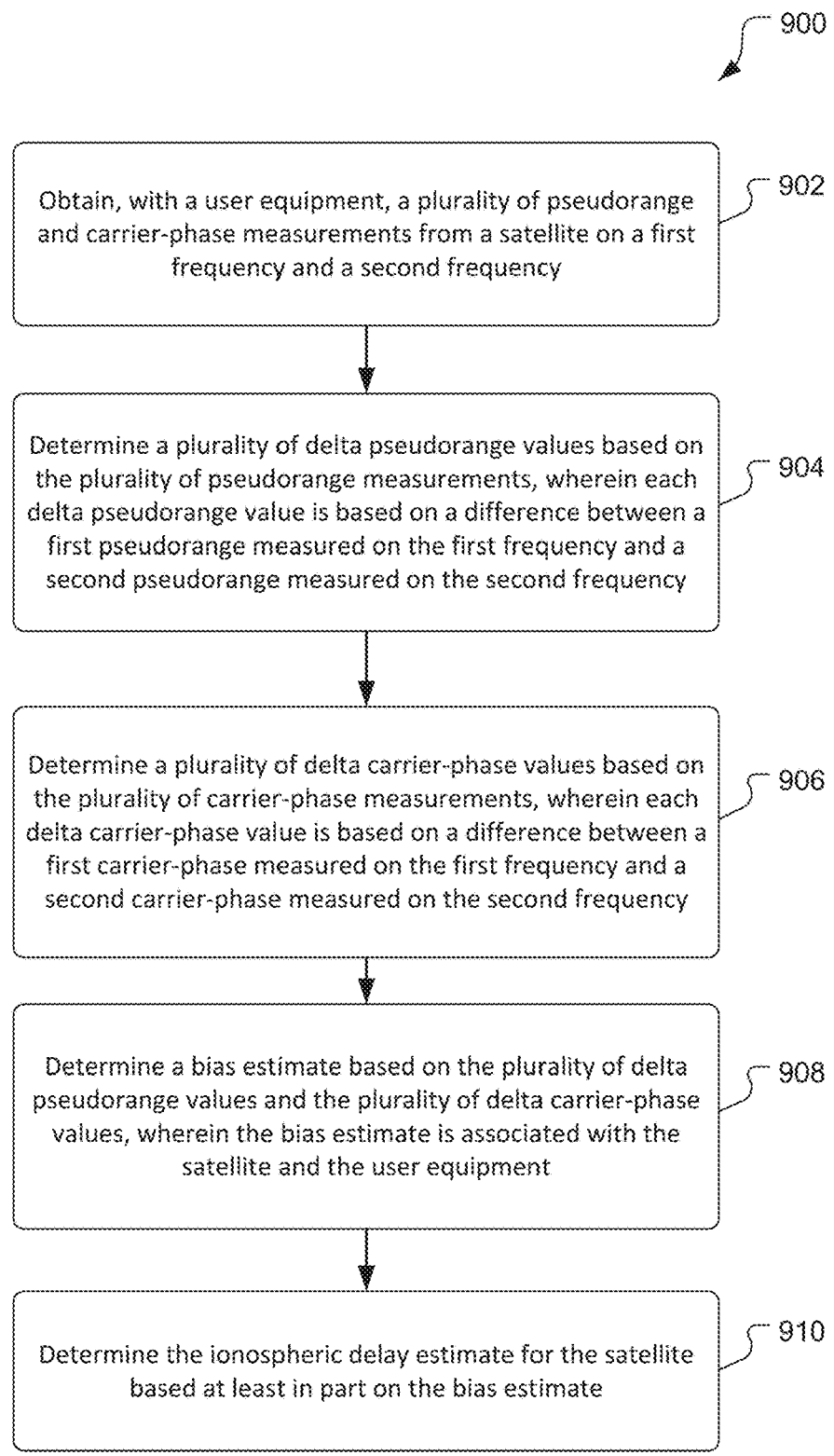
FIG. 9 is a process flow diagram of an example method for determining an ionospheric delay estimate based in part on a bias estimate.

Referring to FIG. 9, with further reference to FIGS. 1-7, a method for determining an ionospheric delay estimate based in part on a bias estimate includes the stages shown. The method 900 is, however, an example only and not limiting. The method 900 may be altered, e.g., by having stages added, removed, rearranged, combined, performed concurrently, and/or having single stages split into multiple stages.

At stage 902, the method includes obtaining, with a user equipment, a plurality of pseudorange and carrier-phase measurements from a satellite on a first frequency and a second frequency. The UE 200 is a means for obtaining the plurality of pseudorange and carrier-phase measurements. The SPS receiver 217 may be configured to receive SPS signals 260 and to process, in whole or in part, the acquired SPS signals 260. Referring to FIG. 6, the SPS signal 260 may include signals on a plurality of frequencies including at least a pair of frequencies such as the first frequency 602 and a second frequency 604.

At stage 904, the method includes determining a plurality of delta pseudorange values based on the plurality of pseudorange measurements, wherein each delta pseudorange value is based on a difference between a first pseudorange measured on the first frequency and a second pseudorange measured on the second frequency. The UE 200 is a means for determining a plurality of delta pseudorange values. In an example, equations (3) and (4) may be combined to solve for a delta pseudorange value for each measurement pair of frequencies, and the delta pseudorange values may be determined as described at equation (7). The UE 200 may be configured to determine corrected delta pseudorange values as described in equation (9).

At stage 906, the method includes determining a plurality of delta carrier-phase values based on the plurality of carrier-phase measurements, wherein each delta carrier-phase value is based on a difference between a first carrier-phase measured on the first frequency and a second carrier-phase measured on the second frequency. The UE 200 is a means for determining the plurality of delta carrier-phase values. In an example, equations (5) and (6) may be combined to solve for delta carrier-phase values for each measurement pair, and the delta carrier-phase values may be determined as described in equation (8). The UE may be configured to determine corrected carrier-phase values as described in equation (10).

At stage 908, the method includes determining a bias estimate based on the plurality of delta pseudorange values and the plurality of delta carrier-phase values, wherein the bias estimate is associated with the satellite and the user equipment. The UE 200 is a means for determining the bias estimate. Referring to FIG. 7, at stage 706 the UE 200 may compute a plurality of delta pseudorange values as described in equation (11) and a plurality of delta carrier-phase measurements as described in equation (12). The $\chi_1^{[i]}$ value described at equation (13) includes the bias values $B_{12}$ and $b_{12}$, and carrier phase ambiguities $N_1^{[i]}$ and $N_2^{[i]}$ which are typically constant over time and the weighted average $\overline{\chi}_{12}$ may be used as the filtered bias estimate to compute the ionospheric delay for the satellite. The bias value $B_{12}$ are the additional bias in the UE 200 that are associated with the first and second frequencies. In an example, determining the bias estimate may include determining a weighted average of the bias estimate over a period of time. The period of time may be based on a number of measurements, or an uncertainty value (e.g., when the bias estimates are within a threshold variance value).

At stage 910, the method includes determining the ionospheric delay estimate for the satellite based at least in part on the bias estimate. The UE 200 is a means for determining the ionospheric delay estimate. Referring to FIG. 7, the ionospheric delay estimate $I_1^{[i]}$ is described in equation (15). The offset in the ionospheric delay estimate is common across dual-frequency pairs from the same GNSS constellation and may be absorbed in the common receiver clock bias estimate or inter-constellation bias estimate. The receiver hardware bias value $B_{12}$ may also be estimated and calibrated when the UE 200 is manufactured. In an example, a delta carrier-phase value may be determined at a desired epoch and the ionospheric delay estimate may be based at least in part on the bias estimate and the delta carrier-phase value at the desired epoch. In an example, a plurality of ionospheric delay estimates may be computed and buffered when the plurality of pseudorange and carrier phase measurements to the satellite on the first frequency and the second frequency are continuously available. An ionospheric delay estimate applicable for an epoch may be determined, and changes in the slant factor may be accounted for using the buffered ionospheric delay estimates. In an example, the ionospheric delay estimate may be used under conditions where only a subset of the plurality of pseudorange and carrier phase measurements to the satellite on the first and the second frequency is available. In an example, the bias estimate may be determined over time and the ionospheric delay estimate may be computed in a specific epoch which is the epoch used for determining the bias estimate. In another example, the bias estimate may be determined over time and the ionospheric delay estimate may be computed in a specific epoch which is not part of the epoch used for determining the bias estimate.

Figure 10:
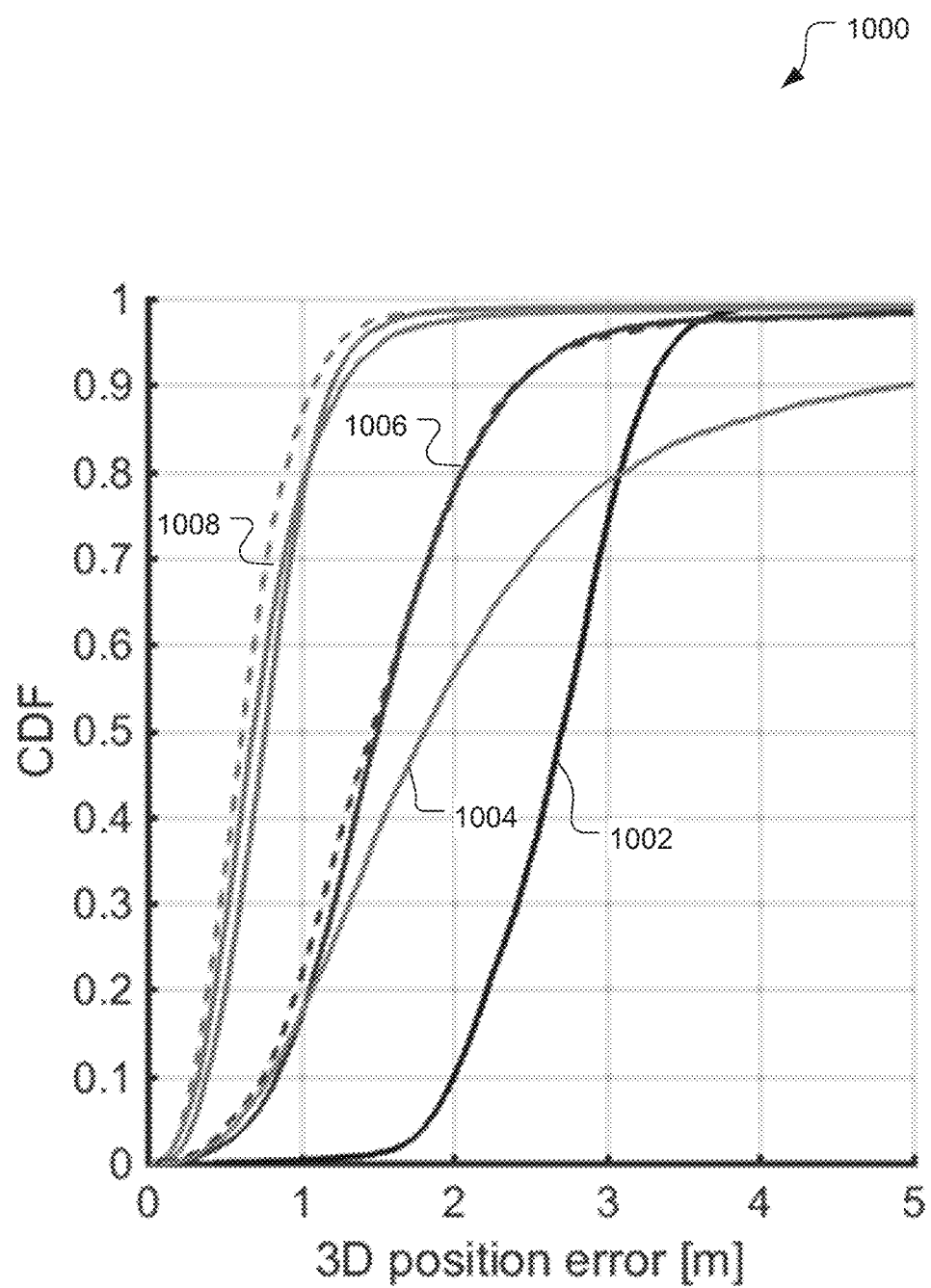
FIG. 10 is an example chart of position errors based on different methods for determining an estimated ionospheric delay.

Referring to FIG. 10, an example chart 1000 of position errors based on different methods for determining an estimated ionospheric delay is shown. The chart 1000 includes a cumulative distribution function (CDF) for 3D position errors (in meters) for four different ionospheric delay estimation methods. A first error line 1002 represents the positioning accuracy of a SPS receiver using broadcast ionospheric delay model information. The broadcast models typically enable compensation of approximately 50% of the ionospheric delay and thus the first error line 1002 is relatively inaccurate as compared to the other methods. A second error line 1004 represents the positioning accuracy of a SPS receiver using a prior-art dual frequency method of removing the ionospheric delay through linear combination (i.e., ionospheric delay free combination). This approach is an improvement over the broadcast method, however, it requires continuous availability of the dual frequencies and will amplify noise on the satellite signals which degrades the position accuracy. Further, the prior art approach requires that the dual frequency measurements be made in the same time epoch. A third error line 1006 represents the positioning accuracy of a SPS receiver using the techniques provided herein. As indicated in the chart 1000, this approach provides improved accuracy as compared to the broadcast and prior-art dual frequency models. These improved results may be obtained without the need to continuously tracking the dual frequencies. As discussed, the SPS receiver may coast through outages in measurement availability. The methods provided herein may be used worldwide without any regional limitations. A fourth error line 1008 represents the positioning accuracy of a SPS receiver utilizing satellite based augmentation service (SBAS) data for the ionospheric delay estimate. The approach may provide higher accuracy, but with significant drawbacks. For example, if the augmentation service data is available, it must be continuously tracked and demodulated which increases the power requirements of a mobile device. There are regional limitations on the availability of service because SBAS is not available globally. Satellites providing augmentation data is also susceptible to blockage and the model data received on the mobile device may be stale, which may lead to less accurate positioning. The error lines 1002, 1004, 1006, 1008 are examples only and not limitations. Other factors may impact the accuracy of a SPS position estimate.

Other examples and implementations are within the scope and spirit of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

As used herein, the singular forms "a," "an." and "the" include the plural forms as well, unless the context clearly indicates otherwise. For example, "a processor" may include one processor or multiple processors. The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Also, as used herein, "or" as used in a list of items prefaced by "at least one of" or prefaced by "one or more of" indicates a disjunctive list such that, for example, a list of "at least one of A. B, or C," or a list of "one or more of A, B, or C" means A or B or C or AB or AC or BC or ABC (i.e., A and B and C), or combinations with more than one feature (e.g., AA, AAB, ABBC, etc.).

Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection. A wireless communication network may not have all communications transmitted wirelessly, but is configured to have at least some communications transmitted wirelessly. Further, the term "wireless communication device," or similar term, does not require that the functionality of the device is exclusively, or evenly primarily, for communication, or that the device be a mobile device, but indicates that the device includes wireless communication capability (one-way or two-way), e.g., includes at least one radio (each radio being part of a transmitter, receiver, or transceiver) for wireless communication.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations provides a description for implementing described techniques. Various changes may be made in the function and arrangement of elements without departing from the spirit or scope of the disclosure.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

The invention claimed is:

1. A method of determining a position of a mobile device, comprising:
    obtaining, with the mobile device, a pseudorange measurements and carrier-phase measurements from a satellite at a first frequency band and a second frequency band;
    determining, with the mobile device, a bias estimate for the satellite based on a plurality of pseudorange measurements and carrier-phase measurements, wherein the bias estimate is associated with a common bias in the mobile device and a clock bias for the satellite;
    determining, with the mobile device, a delta carrier-phase measurement for the satellite based on a difference between the carrier-phase measurements at the first frequency band and the second frequency band;
    determining, with the mobile device, an ionospheric delay estimate based at least on the bias estimate and the delta carrier-phase measurement; and
    determining, with the mobile device, the position of the mobile device based at least in part on the ionospheric delay estimate and the pseudorange measurements, or the ionospheric delay estimate and the carrier-phase measurements, or the ionospheric delay estimate and both the pseudorange measurements and the carrier-phase measurements, wherein the ionospheric delay estimate is used with a slant factor corresponding to an elevation of the satellite.

2. The method of claim 1 wherein the plurality of pseudorange measurements and carrier-phase measurements are obtained in an epoch.

3. The method of claim 2 wherein the delta carrier-phase measurement at the epoch corresponds to the plurality of pseudorange measurements and carrier-phase measurements received in the epoch.

4. The method of claim 2 further comprising determining the bias estimate across multiple, continuous epochs and the delta carrier-phase measurement is determined at the epoch.

5. The method of claim 4 wherein determining the bias estimate includes determining a divergence-free, smoothed estimate based on the plurality of pseudorange measurements and carrier-phase measurements.

6. The method of claim 5 wherein the bias estimate is based on a weighted average of a plurality of delta-pseudorange measurements and a plurality of delta-carrier-phase measurements with the satellite based on the first frequency band and the second frequency band made over time.

7. The method of claim 1 wherein a first number of the pseudorange measurements and carrier-phase measurements received on the first frequency band is greater than a second number of the plurality of pseudorange measurements and carrier-phase measurements received on the second frequency band.

8. An apparatus, comprising:
    a memory;
    at least one receiver;
    at least one processor communicatively coupled to the memory and the at least one receiver, the at least one processor configured to:

obtain, via the at least one receiver, a pseudorange measurements and carrier-phase measurements from a satellite at a first frequency band and a second frequency band;

determine a bias estimate for the satellite based on a plurality of pseudorange measurements and carrier-phase measurements, wherein the bias estimate is associated with a common bias in the the apparatus and a clock bias for the satellite;

determine a delta carrier-phase measurement for the satellite based on a difference between the carrier-phase measurements at the first frequency band and the second frequency band;

determine an ionospheric delay estimate based at least on the bias estimate and the delta carrier-phase measurement; and determine a position of the apparatus based at least in part on the ionospheric delay estimate and the pseudorange measurements, or the ionospheric delay estimate and the carrier-phase measurements, or the ionospheric delay estimate and both the pseudorange measurements and the carrier-phase measurements, wherein the ionospheric delay estimate is used with a slant factor corresponding to an elevation of the satellite.

9. The apparatus of claim 8 wherein the plurality of pseudorange measurements and carrier-phase measurements are obtained in an epoch.

10. The apparatus of claim 9 wherein the at least one processor is further configured to determine the delta carrier-phase measurement based on the plurality of pseudorange measurements and carrier-phase measurements received in the epoch.

11. The apparatus of claim 9 wherein the at least one processor is further configured to determine the bias estimate across multiple, continuous epochs and determine the delta carrier-phase measurement in the epoch.

12. The apparatus of claim 11 wherein the at least one processor is further configured to determine a divergence-free, smoothed estimate based on the plurality of pseudorange measurements and carrier-phase measurements.

13. The apparatus of claim 12 wherein the at least one processor is further configured to compute a weighted average of a plurality of delta-pseudorange measurements and a plurality of delta-carrier-phase measurements with the satellite based on the first frequency band and the second frequency band made over time.

14. The apparatus of claim 8 wherein a first number of the pseudorange measurements and carrier-phase measurements received on the first frequency band is greater than a second number of the plurality of pseudorange measurements and carrier-phase measurements received on the second frequency band.

15. An apparatus for determining a position of a mobile device, comprising:

means for obtaining a pseudorange measurements and carrier-phase measurements from a satellite at a first frequency band and a second frequency band;

means for determining a bias estimate for the satellite based on a plurality of pseudorange measurements and carrier-phase measurements, wherein the bias estimate is associated with a common bias in the mobile device and a clock bias for the satellite;

means for determining a delta carrier-phase measurement for the satellite based on a difference between the carrier-phase measurements at the first frequency band and the second frequency band;

means for determining an ionospheric delay estimate based at least on the bias estimate and the delta carrier-phase measurement; and means for determining the position of the mobile device based at least in part on the ionospheric delay estimate and the pseudorange measurements, or the ionospheric delay estimate and the carrier-phase measurements, or the ionospheric delay estimate and both the pseudorange measurements and the carrier-phase measurements, wherein the ionospheric delay estimate is used with a slant factor corresponding to an elevation of the satellite.

16. The apparatus of claim 15 wherein the plurality of pseudorange measurements and carrier-phase measurements are obtained in an epoch.

17. The apparatus of claim 16 wherein the delta carrier-phase measurement at the epoch corresponds to the plurality of pseudorange measurements and carrier-phase measurements received in the epoch.

18. The apparatus of claim 16 further comprising means for determining the bias estimate across multiple, continuous epochs and the delta carrier-phase measurement is determined at the epoch.

19. The apparatus of claim 18 wherein the means for determining the bias estimate includes means for determining a divergence-free, smoothed estimate based on the plurality of pseudorange measurements and carrier-phase measurements.

20. The apparatus of claim 19 wherein the bias estimate is based on a weighted average of a plurality of delta-pseudorange measurements and a plurality of delta-carrier-phase measurements with the satellite based on the first frequency band and the second frequency band made over time.

21. The apparatus of claim 15 wherein a first number of the pseudorange measurements and carrier-phase measurements received on the first frequency band is greater than a second number of the plurality of pseudorange measurements and carrier-phase measurements received on the second frequency band.

22. A non-transitory processor-readable storage medium comprising processor-readable instructions configured to cause one or more processors to determine a position of a mobile device, comprising instructions for:

obtaining a pseudorange measurements and carrier-phase measurements from a satellite at a first frequency band and a second frequency band;

determining a bias estimate for the satellite based on a plurality of pseudorange measurements and carrier-phase measurements, wherein the bias estimate is associated with a common bias in the mobile device and a clock bias for the satellite;

determining a delta carrier-phase measurement for the satellite based on a difference between the carrier-phase measurements at the first frequency band and the second frequency band;

determining an ionospheric delay estimate based at least on the bias estimate and the delta carrier-phase measurement; and determining the position of the mobile device based at least in part on the ionospheric delay estimate and the pseudorange measurements, or the ionospheric delay estimate and the carrier-phase measurements, or the ionospheric delay estimate and both the pseudorange measurements and the carrier-phase measurements, wherein the ionospheric delay estimate is used with a slant factor corresponding to an elevation of the satellite.

23. The non-transitory processor-readable storage medium of claim 22 wherein the plurality of pseudorange measurements and carrier-phase measurements are obtained in an epoch.

24. The non-transitory processor-readable storage medium of claim 23 wherein the delta carrier-phase measurement at the epoch corresponds to the plurality of pseudorange measurements and carrier-phase measurements received in the epoch.

25. The non-transitory processor-readable storage medium of claim 23 further comprising instructions for determining the bias estimate across multiple, continuous epochs and the delta carrier-phase measurement is determined at the epoch.

26. The non-transitory processor-readable storage medium of claim 25 wherein the instructions for determining the bias estimate includes instructions for determining a divergence-free, smoothed estimate based on the plurality of pseudorange measurements and carrier-phase measurements.

27. The non-transitory processor-readable storage medium of claim 26 wherein the bias estimate is based on a weighted average of a plurality of delta-pseudorange measurements and a plurality of delta-carrier-phase measurements with the satellite based on the first frequency band and the second frequency band made over time.

28. The non-transitory processor-readable storage medium of claim 22 wherein a first number of the pseudorange measurements and carrier-phase measurements received on the first frequency band is greater than a second number of the plurality of pseudorange measurements and carrier-phase measurements received on the second frequency band.

* * * * *